US012428697B2

(12) United States Patent
Nakano et al.

(10) Patent No.: US 12,428,697 B2
(45) Date of Patent: Sep. 30, 2025

(54) STEEL SHEET

(71) Applicant: NIPPON STEEL CORPORATION, Tokyo (JP)

(72) Inventors: Katsuya Nakano, Tokyo (JP); Kengo Takeda, Tokyo (JP); Yuya Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 660 days.

(21) Appl. No.: 17/798,826

(22) PCT Filed: Mar. 16, 2020

(86) PCT No.: PCT/JP2020/011540
§ 371 (c)(1),
(2) Date: Aug. 10, 2022

(87) PCT Pub. No.: WO2021/186510
PCT Pub. Date: Sep. 23, 2021

(65) Prior Publication Data
US 2023/0087014 A1 Mar. 23, 2023

(51) Int. Cl.
*C22C 38/04* (2006.01)
*B32B 15/01* (2006.01)
(Continued)

(52) U.S. Cl.
CPC .............. *C21D 9/46* (2013.01); *B32B 15/013* (2013.01); *C21D 6/004* (2013.01); *C21D 6/005* (2013.01);
(Continued)

(58) Field of Classification Search
CPC ........... B32B 15/013; C23C 2/12; C23C 2/28; C23C 2/40
See application file for complete search history.

(56) References Cited

U.S. PATENT DOCUMENTS

2012/0222781 A1   9/2012   Azuma et al.
2016/0160335 A1   6/2016   Ikeda
(Continued)

FOREIGN PATENT DOCUMENTS

JP   2004-323951 A   11/2004
JP   2015-34334 A    2/2015
(Continued)

*Primary Examiner* — Lois L Zheng
(74) *Attorney, Agent, or Firm* — Birch, Stewart, Kolasch & Birch, LLP

(57) ABSTRACT

The present invention provides steel sheet having both bendability and hydrogen embrittlement resistance. The steel sheet of the present invention includes a central part of sheet thickness and a surface sort part formed at one side or both sides of the central part of sheet thickness. The microstructure of the central part of sheet thickness comprises, by volume ratio, 60% or more of tempered martensite, respectively less than 30% of ferrite, bainite, pearlite, and retained austenite, and less than 5% of as-quenched martensite. A thickness of the surface soft part is more than 10 μm per side and 15% or less of a thickness of the central part of sheet thickness, an average hardness of the surface soft part is 0.90 time or less of an average hardness of the central part of sheet thickness, the surface soft part includes carbides in a number density of $1\times10^4/mm^2$ or more, an average particle size of the carbides is 0.250 μm or less, and a standard deviation of a log of a particle size is 0.05 or less.

7 Claims, 1 Drawing Sheet

(51) Int. Cl.
 *C21D 6/00* (2006.01)
 *C21D 8/02* (2006.01)
 *C21D 9/46* (2006.01)
 *C22C 38/00* (2006.01)
 *C22C 38/02* (2006.01)
 *C22C 38/06* (2006.01)
 *C22C 38/22* (2006.01)
 *C22C 38/28* (2006.01)
 *C22C 38/32* (2006.01)
 *C22C 38/42* (2006.01)
 *C22C 38/48* (2006.01)
 *C22C 38/58* (2006.01)
 *C23C 4/10* (2016.01)

(52) U.S. Cl.
 CPC ........... *C21D 6/008* (2013.01); *C21D 8/0205* (2013.01); *C21D 8/0226* (2013.01); *C22C 38/001* (2013.01); *C22C 38/002* (2013.01); *C22C 38/005* (2013.01); *C22C 38/02* (2013.01); *C22C 38/06* (2013.01); *C22C 38/22* (2013.01); *C22C 38/28* (2013.01); *C22C 38/32* (2013.01); *C22C 38/42* (2013.01); *C22C 38/48* (2013.01); *C22C 38/58* (2013.01); *C21D 2211/002* (2013.01); *C21D 2211/005* (2013.01); *C21D 2211/008* (2013.01); *C21D 2211/009* (2013.01)

(56) References Cited

U.S. PATENT DOCUMENTS

2017/0037488 A1 2/2017 Hasegawa et al.
2017/0211164 A1 7/2017 Kimura et al.

FOREIGN PATENT DOCUMENTS

| JP | 2015-117403 A | 6/2015 |
| WO | WO 2011/065591 A1 | 6/2011 |
| WO | WO 2016/013145 A1 | 1/2016 |

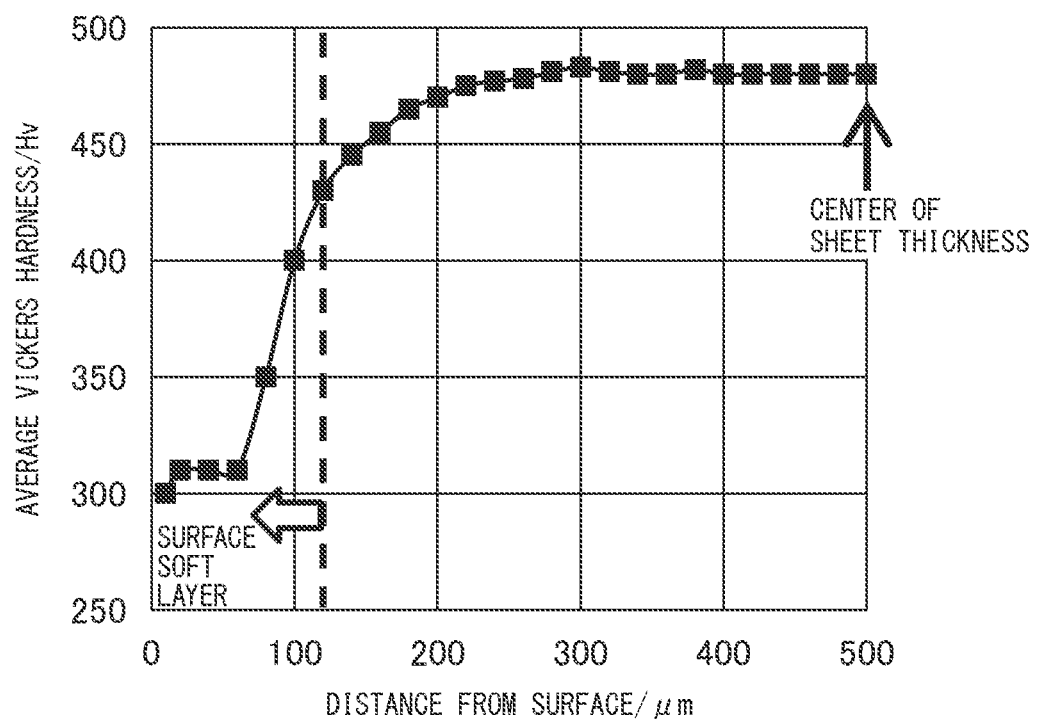

STEEL SHEET

FIELD

The present invention relates to a steel sheet.

BACKGROUND

In recent years, from the viewpoints of improving the fuel efficiency of automobiles for better environmental protection etc., it is sought to make the steel sheet for automobile use higher in strength to make it thinner and lighten the weight of the car body. Further, steel sheet is worked into complicated shapes, so formability is also sought. However, in general, if the strength is improved, steel sheet falls in ductility and stretch flangeability and the formability deteriorates. For this reason, the strength and formability of steel sheet are difficult to simultaneously obtain. Further, the work performed on high strength steel sheet is mainly bending. Bendability and ductility become important.

Up to now, attempts have been made trying to improve the bendability of the steel sheet.

For example, PTL 1 describes high strength plated steel sheet comprised of a steel sheet and a plating layer having, in order from the interface of the same to the steel sheet side, an internal oxide layer containing oxides of Si and/or Mn, a soft layer including the internal oxide layer, and a hard layer comprised of a structure mainly consisting of martensite and bainite, having an average depth T of the soft layer of 20 μm or more, and having an average depth "t" of the internal oxide layer of 4 μm or more and less than T and describes a method of production of the same.

PTL 2 describes high strength hot dip galvanized steel sheet having a value (ΔHv) of a Vickers hardness at a position of 100 μm from a surface of the steel sheet minus a Vickers hardness at a position of the steel sheet of a depth of 20 μm from the surface of 30 or more and describes a method of production of the same.

PTL 3 describes high strength hot dip galvanized steel sheet having a hardness at a position of 5 μm from the surface layer in the sheet thickness direction of 80% or less of a hardness at a position of ½ in the sheet thickness direction and having a hardness at a position of 15 μm from the surface layer in the sheet thickness direction of 90% or more of a hardness at a position of ½ in the sheet thickness direction and describes a method of production of the same.

Further, if the steel sheet is made high strength, hydrogen embrittlement easily occurs. "Hydrogen embrittlement" is the phenomenon of hydrogen penetrating the inside of the steel sheet from the environment and the steel sheet breaking due to a load stress of the tensile stress or less at a location where high stress is imparted.

Up until now, attempts have been made to improve the hydrogen embrittlement resistance.

PTL 4 describes steel sheet realizing both high strength and hydrogen embrittlement resistance by making the surface layer a soft layer increased in ferrite fraction by decarburization treatment and making the inside of the steel sheet a structure mainly comprised of ferrite and having dispersed in it a small amount of martensite having fine blocks.

PTL 5 describes high strength galvanized steel sheet improved in hydrogen embrittlement resistance by making the structure of the steel sheet a mainly martensite structure, making carbides of Nb, Ti, Cr, V, Mo, etc. precipitate, and using the carbides as trap sites for hydrogen.

CITATIONS LIST

Patent Literature

[PTL 1] Japanese Unexamined Patent Publication No. 2015-34334
[PTL 2] Japanese Unexamined Patent Publication No. 2015-117403
[PTL 3] WO2016/013145
[PTL 4] WO2011/065591
[PTL 5] Japanese Unexamined Patent Publication No. 2004-323951

SUMMARY

Technical Problem

PTLs 1 to 5 do not have any descriptions relating to steel sheet aimed at realizing both bendability and hydrogen embrittlement resistance. Therefore, the present invention has as its object the provision of steel sheet having both bendability and hydrogen embrittlement resistance.

Solution to Problem

The inventors studied the bendability and hydrogen embrittlement resistance of steel sheet. First, the inventors produced steel sheet having a surface soft part and investigated the bendability with reference to conventional knowledge. Steel sheet having a surface soft part is found to be improved in bendability compared with steel sheet not having a surface soft part. At this time, it was learned that making the average hardness of the surface soft part lower and making the thickness of the surface soft part thicker generally contributes to improvement of the bendability of the steel sheet. Furthermore, the inventors used various methods for softening the surface layer and continued with more detailed investigations. As a result, the inventors discovered that there is room for possible improvement of the bendability of steel sheet by adding other means to adjustment of the average hardness or thickness of the surface soft part.

Therefore, the inventors engaged in further detailed studies. As a result, they discovered that multi-layer steel sheet having the later explained features obtained by placing predetermined steel sheets to the two sides of a base material and hot rolling or annealing them under specific conditions is improved the most in bendability. However, as explained later, the steel sheet of the present invention is not limited to such a multi-layer steel sheet. For example, it is also possible to produce the steel sheet of the present invention including surface soft parts and a central part of sheet thickness having the later explained features by decarburizing single-layer steel sheet to soften the surface layer parts.

Next, the inventors investigated the hydrogen embrittlement resistance. Hydrogen embrittlement occurs by hydrogen penetrating the inside of steel sheet from the surface and the hydrogen concentrating at regions where high stress is imparted. Therefore, the inventors studied making steel sheet which is resistant to penetration by hydrogen into it. As a result, they clarified that by making carbides disperse in the surface layer parts of steel sheet and trapping hydrogen at these carbides, it is possible to reduce the hydrogen penetrating the high strength central part of sheet thickness and improve the hydrogen embrittlement resistance. However, making carbides disperse at the surfaces of the steel sheet sometimes invites a drop in bendability of the steel sheet. Therefore, the inventors continued with further investigations to realize both excellent hydrogen embrittlement resistance and high bendability. As a result, they discovered that by control of the particle size distribution and number density of the carbides contained in the surface soft parts, steel sheet realizing both excellent hydrogen embrittlement resistance and high bendability can be obtained.

The gist of the present invention obtained in this way is as follows:

(1) A steel sheet including a central part of sheet thickness and a surface soft part formed on one side or both sides of the central part of sheet thickness, in which steel sheet, a microstructure of the central part of sheet thickness comprises, by volume ratio, 60% or more of tempered martensite, respectively less than 30% of ferrite, bainite, pearlite, and retained austenite, and less than 5% of as-quenched martensite, a thickness of the surface soft part is more than 10 μm per side and 15% or less of a thickness of the central part of sheet thickness, an average hardness of the surface soft part is 0.90 time or less of an average hardness of the central part of sheet thickness, the surface soft part includes carbides in a number density of $1 \times 10^4/mm^2$ or more, an average particle size of the carbides is 0.250 μm or less, and a standard deviation of a log of a particle size is 0.05 or less, a tensile strength is 1180 MPa or more, and a chemical composition of the central part of sheet thickness comprises, by mass %, C: 0.10% or more and 0.30% or less, Si: 0.10% or more and 2.50% or less, Mn: 0.10% or more and 10.00% or less, P: 0.10% or less, S: 0.050% or less, Al: 0% or more and 2.500% or less, N: 0.0100% or less, O: 0.0060% or less, Cr: 0% or more and 5.000% or less, Mo: 0% or more and 1.000% or less, B: 0% or more and 0.0100% or less, Ti: 0% or more and 0.300% or less, Nb: 0% or more and 0.300% or less, V: 0% or more and 0.50% or less, Cu: 0% or more and 1.00% or less, Ni: 0% or more and 1.0% or less, Mg: 0% or more and 0.04% or less, Ca: 0% or more and 0.04% or less, REM: 0% or more and 0.04% or less, and a balance of Fe and impurities.

(2) The steel sheet according to (1), wherein the chemical composition of the central part of sheet thickness contains one or more elements selected from, by mass %, Cr: 0.010% or more and 5.000% or less, Mo: 0.010% or more and 1.000% or less, B: 0.0001% or more and 0.0100% or less, Ti: 0.010% or more and 0.300% or less, Nb: 0.010% or more and 0.300% or less, V: 0.01% or more and 0.50% or less, Cu: 0.01% or more and 1.00% or less, Ni: 0.1% or more and 1.0% or less, Mg: 0.01% or more and 0.04% or less, Ca: 0.01% or more and 0.04% or less, and REM: 0.01% or more and 0.04% or less.

(3) The steel sheet according to (1) or (2), wherein the content of C of the surface soft part is 0.9 time or less of the content of C of the central part of sheet thickness.

(4) The steel sheet according to any one of (1) to (3), wherein a surface of the surface soft part further has a hot dip galvanized layer, a hot dip galvannealed layer, or an electrogalvanized layer.

Advantageous Effects of Invention

According to the present invention, it is possible to provide steel sheet having both excellent bendability and hydrogen embrittlement resistance. Such steel sheet of the present invention is optimal for a material for auto part use etc.

BRIEF DESCRIPTION OF DRAWINGS

FIG. 1 is a view showing the average Vickers hardnesses at positions in the sheet thickness direction of steel sheets according to embodiments of the present invention.

DESCRIPTION OF EMBODIMENTS

Below, embodiments of the present invention will be explained.

The steel sheet of the present invention has a central part of sheet thickness and a surface soft part formed at one side or both sides of the central part of sheet thickness.

The microstructure of the central part of sheet thickness is comprised of, by volume ratio, 60% or more of tempered martensite, less than 30% each of ferrite, bainite, pearlite, and retained austenite, and less than 5% of as-quenched martensite. Note that, the microstructure of the surface soft part is not particularly limited so long as the surface soft part satisfies the later explained characterizing feature.

By making the volume ratio of the tempered martensite at the central part of sheet thickness 60% or more, the tensile strength of the steel sheet can be made 1180 MPa or more. Further, by making the volume ratios of the ferrite, bainite, pearlite, and retained austenite at the central part of sheet thickness respectively less than 30%, the steel sheet can be kept from becoming excessively soft and the tensile strength of the steel sheet can be made 1180 MPa or more. Further, by making the volume fraction of the tempered martensite less than 5% at the central part of sheet thickness, due to this, steel sheet having sufficient bendability can be obtained.

In the present invention, the volume fractions of the microstructure are found as follows:

The volume fractions of the microstructure of the central part of sheet thickness are found as follows:

"Ferrite"

First, a sample having a cross-section of sheet thickness parallel to the rolling direction of the steel sheet is taken and that cross-section is made the observed surface. In this observed surface, a 100 μm×100 μm region centered on a position of ¼ the sheet thickness from the surface of the steel sheet is made the observed region. An electron channeling contrast image seen by examining this observed region by a scanning electron microscope by 1000 to 50000× is an image displaying the crystal orientation difference of the crystal grains as a difference in contrast. The parts of uniform contrast in this electron channeling contrast image are ferrite. Further, the area ratio of the ferrite identified in this way is calculated by the point counting method (based on ASTM E562) and the area ratio of the ferrite is deemed the volume ratio of the ferrite.

"Pearlite"

First, the above observed surface is corroded by a Nital reagent. In the corroded observed surface, a 100 μm×100 μm region centered on a position of ¼ the sheet thickness from the surface of the steel sheet is made the observed region. This observed region is observed by an optical microscope by 1000 to 50000×. The parts of dark contrast in the observed image are deemed to be pearlite. Further, the area ratio of the pearlite identified in this way is calculated by the point counting method and the area ratio of the pearlite is deemed the volume ratio of the pearlite.

"Bainite and Tempered Martensite"

The observed region corroded by the Nital reagent in the above way is observed by a field emission scanning electron microscope (FE-SEM) by 1000 to 50000×. In this observed region, the bainite and tempered martensite are identified in the following way from the positions of the cementite contained inside the structure and the arrangement of the cementite.

As the state of presence of bainite, sometimes cementite or retained austenite is present at the lath shaped bainitic ferrite interfaces and sometimes cementite is present inside the lath shaped bainitic ferrite. If cementite or retained austenite is present at the lath shaped bainitic ferrite interfaces, the bainite can be identified since the interfaces of the bainitic ferrite can be determined. Further, if cementite is present inside the lath shaped bainitic ferrite, the bainite can be identified since there is one type of relationship of crystal orientation of the bainitic ferrite and cementite and the cementite has the same variants. The area ratio of the bainite identified in this way is calculated by the point counting method, and the area ratio of the bainite is deemed the volume ratio of the bainite.

With tempered martensite, there is cementite inside the martensite laths, but there are two or more types of crystal orientation of martensite laths and cementite and cementite comes in several variants, so it is possible to identify the tempered martensite. The area ratio of the tempered martensite identified in this way is calculated by the point counting method. The area ratio of the tempered martensite is deemed the volume ratio of the tempered martensite.

"Tempered Martensite"

First, an observed surface similar to the observed surface used for the above identification of ferrite was etched by LePera's reagent. A region similar to the above identification of ferrite was made the observed region. Martensite and retained austenite are not corroded by LePera's reagent. Therefore, an observed region corroded by LePera's reagent is observed by FE-SEM, while an uncorroded region is deemed martensite and retained austenite. Further, the total area ratio of the martensite and retained austenite identified in this way is calculated by the point counting method, and that area ratio is deemed the total volume ratio of the martensite and retained austenite. Next, the volume ratio of the retained austenite calculated in the following way can be subtracted from the above total volume ratio to thereby calculate the volume ratio of the tempered martensite.

"Retained Austenite"

The volume ratio of the retained austenite can be found by the X-ray diffraction method. First, in the sample taken in the above way, the part from the surface of the steel sheet to a position of ¼ of the sheet thickness is removed by mechanical polishing and chemical polishing and the surface from the surface of the steel sheet to a position of ¼ of the sheet thickness is exposed. Further, the thus exposed surface is irradiated by MoKα rays and the integrated intensity ratio of the diffraction peaks of the (200) face and (211) face of the bcc phase and the (200) face, (220) face, and (311) face of the fcc phase is found. From the integrated intensity ratio of the diffraction peaks, it is possible to calculate the volume ratio of the retained austenite. As this method of calculation, the general five-peak method can be used.

Further, the thickness of the surface soft part of the steel sheet of the present invention is, per side, more than 10 μm and 15% or less of the thickness of the central part of sheet thickness. By the thickness of the surface soft part per side being more than 10 μm, it becomes easy to raise the bendability of the steel sheet. On the other hand, by the thickness of the surface soft part per side being 15% or less of the thickness of the central part of sheet thickness, it becomes easy to raise the tensile strength of the steel sheet.

Further, the average hardness of the surface soft part of the present invention is 0.90 time or less of the average hardness of the central part of sheet thickness. By making the average hardness of the surface soft part 0.90 time or less of the average hardness of the central part of sheet thickness, it becomes easy to raise the bendability of the steel sheet. The average hardness of the surface soft part preferably 0.80 time or less, more preferably 0.60 time or less, with respect to the average hardness of the central part of sheet thickness.

The lower limit of the ratio of the average hardness of the surface soft part with respect to the average hardness of the central part of sheet thickness is not particularly set, but the average hardness of the surface soft part is preferably more than 0.50 time the average hardness of the central part of sheet thickness. By the average hardness of the surface soft part being made more than 0.50 time the average hardness of the central part of sheet thickness, it is possible to keep the tensile strength of the steel sheet from becoming insufficient. Note that, the tensile strength of the steel sheet is determined by the material qualities of the central part of sheet thickness and the surface soft part etc., so is not determined by only the ratio of the central part of sheet thickness and the average hardness of the surface soft part.

Note that, in the present invention, the average hardness of the central part of sheet thickness means the average Vickers hardness of the central part of sheet thickness, while the average hardness of the surface soft part means the average Vickers hardness of the surface soft part. Furthermore, the average Vickers hardness of the central part of sheet thickness and the average Vickers hardness of the surface soft part are determined in the following way using a Vickers hardness meter by an indentation load of 100 g (0.98N) based JIS Z 2244 (2009). First, at intervals of 2% of sheet thickness toward the surface starting from a position of ½ thickness from the surface of the steel sheet, the Vickers hardnesses of five points each on a line perpendicular to the direction of sheet thickness and parallel to the rolling direction are measured. Further, the average value of the Vickers hardnesses of five points at positions in the sheet thickness direction measured in this way was found and the average value was made the average Vickers hardness at the positions in the sheet thickness direction. Further, the average Vickers hardness at a position of ½ thickness from the surface of the steel sheet is made the average Vickers hardness of the central part of sheet thickness. Next, the surface side from the position in the sheet thickness position where the average Vickers hardness becomes 0.9 time or less of the average Vickers hardness at a position of ½ thickness from the surface of the steel sheet is defined as the surface soft part. At the thus defined surface soft part, the Vickers hardnesses of 10 points are measured at random and the average value of the Vickers hardnesses of these 10 points is made the average Vickers hardness of the surface soft part.

FIG. 1 is a view showing the average Vickers hardnesses at positions in the sheet thickness direction of steel sheets according to embodiments of the present invention. In FIG. 1, the hardness distribution up to a position of ½ thickness from the surface of the steel sheet of a sheet thickness of 1 mm is shown. The abscissa of FIG. 1 shows the position in the sheet thickness direction (μm). The surface of the steel sheet is 0 μm, and the position of ½ thickness from the surface of the steel sheet is 500 μm. The ordinate of FIG. 1 shows at the average Vickers hardness at positions in the sheet thickness direction. In the examples shown in FIG. 1, the average Vickers hardness at a position of ½ thickness from the surface of the steel sheet is 480 Hv. Accordingly, in this example, the surface side from the position where 480 Hv×0.9=432 Hv or less is the surface soft part.

Further, the surface soft part of the steel sheet of the present invention contains carbides.

As the above carbides, iron-based carbides and alloy carbides may be mentioned. "Iron-based carbides" is the general name for carbides comprised of mainly Fe and C. For example, the different crystal structure ε carbides, χ carbides, and cementite (θ carbides) fall under iron-based carbides. "Alloy carbides" is the general name for carbides comprised of metal elements other than Fe and of C. For example, TiC, NbC, VC, etc. fall under alloy carbides.

To suppress deterioration of the bendability of steel sheet while raising the hydrogen embrittlement resistance, in the surface soft part, it is necessary to raise the number density of carbides which do not contribute much to cracking of the steel sheet. Therefore, the surface soft part of the steel sheet of the present invention includes the above carbides with an average particle size of 0.250 μm or less and a standard deviation of the log of particle size of 0.05 or less in a number density of $1\times10^4$/mm$^2$ or more. By control of the carbides included in the surface soft part in this way, the carbides no longer contribute much to cracking of the steel sheet and the hydrogen penetrating from the surface of the steel sheet becomes easily trapped by the carbides. By the hydrogen being trapped by the carbides of the surface soft part, penetration of hydrogen to the central part of sheet thickness is suppressed and the hydrogen embrittlement resistance of the steel sheet can be improved.

The larger the average particle size of the carbides, the easier it is for the interfaces of the carbides and matrix microstructure to become starting points of occurrence of cracking at the time of bending deformation of the steel sheet. By making the average particle size of the carbides 0.250 μm or less, the interfaces of the carbides and matrix microstructure are kept from becoming starting points of occurrence of cracking at the time of bending deformation of the steel sheet and the deterioration of the bendability of the steel sheet can be suppressed. The lower limit of the average particle size of the carbides is not particularly set, but for example is 0.05 μm or more.

By making the standard deviation of the log of the particle size of the carbides 0.05 or less, the possibility of coarse carbides being included becomes lower. For this reason, the interfaces of the carbides and matrix microstructure are kept from becoming starting points of occurrence of cracking at the time of bending deformation of the steel sheet and the deterioration of the bendability of the steel sheet can be suppressed. The lower limit of the average particle size of the carbides is not particularly set. However, making the standard deviation of the log of the particle size of the carbides less than 0.01 is difficult, so the standard deviation of the log of the particle size of the carbides may be made 0.01 or more.

By making the number density of the carbides $1\times10^4$/mm$^2$ or more, at the surface soft part, hydrogen becomes easy to trap at the carbides and the hydrogen embrittlement resistance of the steel sheet becomes easier to raise. The upper limit of the number density of the carbides is preferably $1\times10^5$/mm$^2$ or less from the viewpoint of deterioration of the bendability of the steel sheet.

In the present invention, the number density of carbides of the surface soft part and the average particle size and the standard deviation of the log of the particle size are found as follows: First, a sample having a cross-section of sheet thickness parallel to the rolling direction of the steel sheet is taken. That cross-section is made the observed surface. This is polished by wet polishing by emery paper and polished by diamond abrasive grains having an average particle size of 1 μm to finish the observed surface to a mirror surface. After that, the structure of the observed surface is etched by a 3% nitric acid alcohol solution.

Next, in the observed surface, at the region judged to be the surface soft part in the above way, parts of a total of $2.0\times10^{-9}$ m$^2$ or more are observed by a field emission scanning electron microscope (FE-SEM) by a 10000× magnification.

Further, image analysis software (Image Pro Plus) made by Media Cybernet is used to find the number of carbides and the circle equivalent diameters of carbides with circle equivalent diameters of 10 nm or more and 10 μm or less for these carbides. The values of the thus found number of carbides divided by the area (mm$^2$) of the observed region is made the number density of the carbides. Further, the average of the circle equivalent diameters of the carbides found in the above way is made the average particle size of the carbides. Furthermore, the standard deviation in a graph having a log of circle equivalent diameters of the carbides as an abscissa and frequency as an ordinate is made the standard deviation of the log of the particle size of the carbides. In the present invention, the carbides covered by measurement are made carbides having a particle size of 0.003 μm or more.

If making VC or other alloy carbides disperse in the steel sheet as a whole like in the prior art, sometimes the amount of addition of the alloying elements of the steel sheet as a whole will increase thereby leading to an increase in costs. However, in the present invention, it is sufficient to control only the carbides contained in the surface soft part rather than the steel sheet as a whole, so the hydrogen embrittlement resistance of the steel sheet can be improved without a large increase in costs.

By having the above constitution, the steel sheet of the present invention is provided with excellent bendability and hydrogen embrittlement resistance in addition to a tensile strength of 1180 MPa or more.

The tensile strength of the steel sheet of the present invention is found by a tensile test. Specifically, a tensile test is conducted based on JIS Z 2241 (2011) using a JIS No. 5 test piece taken perpendicular to the rolling direction of the steel sheet. The maximum tensile test (TS) measured is made the tensile strength of the steel sheet.

The bendability of the steel sheet of the present invention can be evaluated by the limit bending deformation ratio R/t obtained by dividing the limit bending radius R obtained by the following metal material bending test by the sheet thickness "t". The limit bending deformation ratio R/t is found in the following way.

A metal material bending test is conducted by the V-block method based on JIS Z 2248 (2014). First, as the test piece used for this test, a No. 1 test piece is fabricated with a direction perpendicular to the rolling direction becoming the longitudinal direction (bending ridgeline matching rolling direction). In this test, a test piece having a surface soft part at only one side is bent so that the surface soft part becomes the outside of the bend. The vertex of the V-groove of the V-block is made 60°. The radius of the tip of the metal pressing piece is changed in units of 0.5 mm to repeatedly perform the test. Further, the radius of the tip of the metal pressing piece at which the test piece can be bent without crackings being caused is made the limit bending radius R and the value R/t of this limit bending radius R divided by the sheet thickness "t" of the test piece is made the limit bending ratio radius. A steel sheet having a limit bending ratio radius R/t of 1.0 or less is judged to be a steel sheet excellent in bendability.

The hydrogen embrittlement resistance of the steel sheet of the present invention is evaluated in the following way. In the state imparting stress to a 100 mm×30 mm strip-shaped test piece by bending, that strip-shaped test piece is dipped in an ammonium thiocyanate solution. The presence of any cracking occurring is used to evaluate the hydrogen embrittlement resistance. Specifically, the presence of any cracking occurring is confirmed in the following way.

A strip-shaped test piece is cut out so that a longitudinal direction of the strip-shaped test piece becomes perpendicular to the rolling direction of the steel sheet. Its end faces are machined. To impart stress to the strip-shaped test piece by bending later, a round hole is formed by machining. The strip-shaped test piece is bent by three-point bending so that the bending ridgeline becomes parallel to the rolling direction and a strain gauge is attached to the bending vertex. The round hole is bolted to fasten it so that the stress of the bending vertex part becomes the yield strength or 0.2% yield strength found in advance by a tensile test. Next, the stressed test piece is dipped in a 10% ammonium thiocyanate solution and the relationship between the time from the start of dipping and the occurrence of cracking is investigated. The dipping time was made a maximum of 48 hours. A steel sheet with no cracking occurring after being taken out from the solution after 48 hours was judged to be steel sheet excellent in hydrogen embrittlement resistance.

Next, the chemical composition of the central part of sheet thickness desirable for obtaining the above effects of the present invention will be explained. Note that, the "%" relating to the content of elements, unless otherwise indicated, means "mass %". In the present invention, the "chemical composition of the central part of sheet thickness" shall mean the chemical composition measured at a position of ¼ of sheet thickness from the surface of the steel sheet.

The chemical compositions of the central part of sheet thickness shown below are preferable examples. The characterizing feature of the steel sheet of the present invention is that the microstructure, hardness, size or number of carbides, etc. satisfy the above-mentioned conditions. If satisfying the above-mentioned conditions, the chemical composition of the central part of sheet thickness does not necessarily have to satisfy all of the following requirements.

"C: 0.10% or More and 0.30% or Less"

C is an element raising the strength of the steel sheet. To sufficiently raise the strength of the steel sheet by C, the content of C is preferably made 0.10% or more. Further, to obtain excellent toughness and bendability, the content of C is preferably made 0.30% or less.

"Si: 0.10% or More and 2.50% or Less"

Si is an element raising the strength of the steel sheet. Furthermore, Si has the action of suppressing coarsening of carbides, so is also an important element with respect to control of the particle size. To obtain these effects, the content of Si is preferably made 0.10% or more. However, if the content of Si is too great, deterioration of the bendability due to embrittlement of the central part of sheet thickness becomes a concern, so the content of Si is preferably 2.50% or less.

"Mn: 0.10% or More and 10.00% or Less"

Mn is an element raising the hardenability of the high strength steel sheet and thereby raising the strength. To obtain this effect, the content of Mn is preferably made 0.10% or more. However, if the content of Mn is too great, deterioration of the manufacturability of the steel sheet due to the strength of the multilayer sheet or the hot rolled steel sheet excessively rising becomes a concern. For this reason, the content of Mn is preferably 10.00% or less, more preferably 5.00% or less, still more preferably 3.00% or less.

"P: 0.10% or Less"

P is contained in the steel sheet as an impurity and tends to segregate at the central part of sheet thickness of the steel sheet and causes a welded part to become brittle. To keep the welded part from becoming brittle, the content of P is preferably 0.10% or less. The content of P is preferably as small as possible, but making the content of P less than 0.00010% is economically disadvantageous, so the content of P may be 0.00010% or more.

"S: 0.050% or Less"

S is contained in the steel sheet as an impurity and has a detrimental effect on the weldability and the manufacturability at the time of casting and the time of hot rolling. For this reason, the content of S is preferably made 0.050% or less. The content of S is preferably as small as possible, but making the content of S less than 0.00010% is economically disadvantageous, so the content of S may be 0.00010% or more.

"Al: 0% or More and 2.500% or Less"

Al acts as a deoxidizer, so is preferably added in the deoxidation process in accordance with need. Al does not have to be included in the final product steel sheet, but if Al is added for obtaining its effect as a deoxidizer, the final product steel sheet will sometimes contain 0.001% or more of Al. If the content of Al is too great, the danger of the multilayer sheet cracking at the time of continuous casting rises, so the amount of Al contained in the final product steel sheet is preferably made 2.500% or less.

"N: 0.0100% or Less"

N is contained in the steel sheet as an impurity. N forms coarse nitrides and sometimes causes the bendability of the steel sheet to deteriorate. For this reason, the content of N is preferably made 0.0100% or less. In addition, N becomes a cause of occurrence of blowholes at the time of welding, so the content of N may be made as small as possible. However, making the content of N less than 0.0005% invites a large increase in the production costs, so the content of N may be 0.0005% or more.

"O: 0.0060% or Less"

O is contained in the steel sheet as an impurity. O forms oxides and is an element impairing the formability of the steel sheet. For this reason, the content of O is preferably made 0.0060% or less. The content of O is preferably as small as possible, but making the content of O less than 0.0005% invites an excessive increase in costs, so the content of O may be 0.0005% or more.

The above were the main elements, but in the present invention, the steel sheet may further contain the following elements in accordance with need.

"Cr: 0% or More and 5.000% or Less, Mo: 0% or More and 1.000% or Less, and B: 0% or More and 0.010% or Less"

Cr, Mo, and B are elements contributing to improvement of the strength of the steel sheet. This effect due to at least one of any of Cr, Mo, and B being included can be obtained even if the contents of the Cr, Mo, and B are trace amounts. The contents of Cr, Mo, and B may be respectively 0%, but to remarkably obtain the above effects, the content of Cr is preferably 0.010% or more, the content of Mo is preferably 0.010% or more, and the content of B is preferably 0.0001% or more. If the contents of these elements are too great, deterioration of the pickling ability, weldability, and hot formability becomes a concern. For this reason, the content of Cr is preferably 5.000% or less, the content of Mo is preferably 1.000% or less, and the content of B is preferably 0.0100% or less.

"Ti: 0% or More and 0.300% or Less, Nb: 0% or More and 0.300% or Less, and V: 0% or More and 0.50% or Less"

Ti, Nb, and V contribute to a rise in the strength of the steel sheet by precipitation strengthening, grain refinement strengthening by suppression of growth of ferrite crystal grains, and dislocation strengthening through suppression of recrystallization. This effect due to at least one of any of Ti, Nb, and V being included can be obtained even if the contents of the Ti, Nb, and V are trace amounts. The contents of Ti, Nb and V may be respectively 0%, but to remarkably obtain the above effects, the contents of Ti and Nb are preferably made 0.010% or more and the content of V is preferably made 0.01% or more. If the contents of these elements are too great, the amount of precipitation of carbides becomes greater and deterioration of the bendability of the steel sheet becomes a concern. For this reason, the content of Ti is preferably made 0.300% or less, the content of Nb is preferably made 0.300% or less, and the content of V is preferably made 0.50% or less.

"Cu: 0% or More and 1.00% or Less and Ni: 0% or More and 1.0% or Less"

Cu and Ni are elements contributing to improvement of the strength of the steel sheet. This effect can be obtained even with addition of trace amounts. The contents of Cu and Ni may be 0%, but to remarkably obtain the above effect, the content of Cu is preferably 0.010% or more and the content of Ni is preferably 0.10% or more. If the contents of these elements are too great, deterioration of the pickling ability, weldability, hot formability, etc. becomes a concern. For this reason, the content of Cu is preferably 1.00% or less and the content of Ni is preferably 1.0% or less.

"Mg: 0% or More and 0.04% or Less and Ca: 0% or More and 0.04% or Less"

Mg and Ca control the form of the sulfides or oxides and contribute to improvement of the bendability of the steel sheet. This effect can be obtained even with addition of trace amounts. The contents of Mg and Ca may be 0%, but to remarkably obtain the above effect, the content of at least one of Mg and Ca is preferably 0.010% or more. If the contents of these elements are too great, deterioration of the castability is a concern. For this reason, the contents of Mg and Ca are preferably respectively 0.04% or less.

"REM: 0% or More and 0.04% or Less"

REM (rare earth metals) are elements enabling control of the form of sulfides by addition in trace amounts in the same way as Ca and Mg and are added according to need. As REM which the steel sheet of the present invention includes, W, Ta, Sn, Sb, As, Zr, Y, La, and Ce may be illustrated. The content of REM may be 0%, but to obtain the effect of control of the form of sulfides by REM, the content of REM is preferably 0.01% or more. On the other hand, if the content of REM is excessive, sometimes coarse inclusions are formed and the formability of the steel sheet falls. For this reason, the content of REM is preferably 0.04% or less. REM are often added as misch metals, but are also sometimes added combined with La or Ce or in addition elements of the lanthanoids.

Note that, the balance of the chemical composition of the central part of sheet thickness consists of Fe and impurities. As impurities, elements unavoidably entering from the steel raw materials or scrap or elements unavoidably entering in the steelmaking process for which inclusion is allowed in a range in which the high strength steel sheet of the present invention can exhibit the above effect of the present invention can be illustrated.

Next, the chemical composition of the surface soft part will be explained. The chemical composition of the surface soft part desirable for obtaining the effect of the present invention is similar in ranges of contents and reasons for the same as the central part of sheet thickness other than the C. In the high strength steel sheet of the present invention, the contents of the surface soft part other than the content of C are substantially no different from the central part of sheet thickness.

Note that, the chemical compositions of the surface soft part shown below are preferable examples. The characterizing feature of the steel sheet of the present invention is that the microstructure, hardness, and size or number of carbides satisfy the above-mentioned conditions. If the above-mentioned conditions are satisfied, the chemical composition of the surface soft part does not necessarily have to be the preferable ranges. The preferable content of C of the surface soft part is as follows:

"C: 0.9 Time or Less of Amount of Carbon of Central Part of Sheet Thickness"

C is an element raising the strength of the steel sheet and simultaneously is added for forming carbides. From the viewpoint of making the surface soft part softer than the central part of sheet thickness, the content of C contained in the surface soft part is preferably made 0.9 time or less of the amount of C of the central part of sheet thickness. Further, to form sufficient carbides at the surface soft part and obtain sufficient hydrogen embrittlement resistance, the content of C is preferably made 0.010% or more. On the other hand, if the content of C is too great, there is a concern that the number density of carbides will become excessive, the hardness of the surface soft part will excessively rise, and the bendability of the steel sheet will deteriorate. For this reason, the content of C is preferably made 0.15% or less.

The effect of the present invention, that is, the excellent bendability and hydrogen embrittlement resistance, is similarly realized even if hot dip galvanization, hot dip galvannealing, electrogalvanization, or other surface treatment is applied. Accordingly, the steel sheet of the present invention includes steel sheet having hot dip galvanization, hot dip galvannealing, or electrogalvanization at its surface.

Next, the mode of the process of production for obtaining the steel sheet of the present invention will be explained. The following explanation is just one example of the production process for obtaining the steel sheet of the present invention. The steel sheet of the present invention is not limited to a multi-layer steel sheet obtained by placement of two steel sheets such as explained below. For example, the steel sheet of the present invention can be obtained by reducing the amount of carbon at the surface layer by decarburization.

First, a surface layer-use steel sheet for forming the surface soft part is placed on one side or both sides of a base steel sheet for forming the central part of sheet thickness to thereby form a multilayer sheet.

Next, by processing the above multilayer sheet (multilayer steel sheet) by hot rolling, cold rolling, continuous annealing, etc., the steel sheet of the present invention can be obtained. Further, if making the steel sheet of the present invention a plated steel sheet, continuous hot dip coating or other processing may also be performed.

The above multi-layer steel sheet used for the hot rolling is preferably heated at 1080° C. or more and 1350° C. or less in temperature and held for 60 minutes or more 300 minutes or less. By making the heating temperature of the multi-layer steel sheet 1080° C. or more, it is possible to suppress anisotropy of the crystal orientation due to casting. On the other hand, by making the heating temperature of the multi-layer steel sheet 1350° C. or less, it is possible to suppress any major increase in production costs. Further, the heating time in this process is preferably made 1 hour or more from the viewpoint of making the alloying elements contained in the steel sheet sufficiently dissolve. The steel sheet of the present invention has a tensile strength of 1180 MPa or more and contains a relatively large amount of alloying elements. After heating the multi-layer steel sheet in this way, it is hot rolled under ordinary conditions to obtain a hot rolled steel sheet. As the conditions of the hot rolling, for example, an end temperature (finishing temperature) of the hot rolling of 800° C. or more and 980° C. or less, a coiling temperature of 20° C. or more and 700° C. or less, and other conditions may be mentioned.

Next, the above hot rolled steel sheet is pickled. This pickling process is an important process in not only removing oxides on the surface of the hot rolled steel sheet, but also controlling the carbides contained in the surface soft part after the later process of the annealing process. By making a pickling pick count (PPc) of the steel sheet surface before cold rolling 60 (/mm) or more by pickling, it is possible to control surface layer shear strain introduced by the cold rolling. The pickling pick count (PPc) is measured using a stylus type surface roughness measuring device based on JIS B 0601 (2013). The surface layer shear strain forms nucleation sites of carbides at the time of heat treatment. The higher the surface layer shear strain, the more the nucleation sites increase and the more the amount of fine carbides that can be dispersed. Further, by controlling the surface layer shear strain in this way, the number of carbides contained in the surface soft part, the average particle size, and the standard deviation of the log of the grain size can be controlled to the above-mentioned ranges.

The solution used for the pickling may be an ordinary solution used for pickling. For example, 5 vol % or more hydrochloric acid or sulfuric acid may be mentioned. The higher the pickling bath temperature or the longer the pickling time, the greater the surface roughness of the steel sheet after pickling. The pickling may be performed one time or may be performed several times. Accordingly, the above "pickling time" means the time of single pickling when performing pickling only one time and means the total time of pickling when performing pickling several times. As the pickling conditions, for example the pickling can be performed at 85 to 95° C. for a time of 400 to 800 seconds. Note that, if conditions are selected giving a PPc of the surface of the steel sheet after pickling becoming the above range, the conditions of the pickling are not limited to the above example. However, the de facto upper limit of the pickling temperature is the boiling point of water of 100° C.

Next, the pickled steel sheet is cold rolled. By the cold rolling, the steel sheet is kept from losing ductility and breaking, so the total of the rolling reduction is preferably made 85% or less. On the other hand, in the later process of the annealing process, to make the recrystallization of the surface soft part sufficiently proceed and sufficiently obtain the nucleation sites for carbides at the surface soft part, the total reduction rate in the cold rolling is preferably made 20% or more, more preferably 30% or more. Note that, for the purpose of reducing the cold rolling load before cold rolling, the steel sheet may be annealed at a temperature of 700° C. or less.

Next, the annealing after cold rolling will be explained. If the amount of carbon contained in surface layer-use steel sheet forming the surface soft part is smaller than the amount of carbon contained in the base steel sheet forming the central part of sheet thickness, the surface soft part will be lower in hardenability compared with the central part of sheet thickness. For this reason, at the surface soft part, almost no low temperature transformed structures will be formed at the time of annealing. Accordingly, in the structure of the surface soft part after annealing, parts once transformed to austenite will become transformed ferrite or pearlite and carbides.

The annealing is, for example, performed by passing the cold rolled multi-layer steel sheet (cold rolled steel sheet) through a continuous annealing line. With annealing on a continuous annealing line, first, a heating process is performed holding the cold rolled steel sheet at the $A_3$ point of the base steel sheet calculated by the following formula 1 minus 50° C. or more and 700° C. or more and 900° C. or less in heating temperature for 5 seconds or more. During this heating, the austenite fraction is raised and the microstructure after annealing can be controlled. With a heating temperature of less than the $A_3$ point−50° C. or less than 700° C., 60% or more of tempered martensite is difficult to obtain. By making the heating temperature more than 900° C., there is no major effect on the percentages of structures, but this is disadvantageous economically. With a holding time of less than 5 seconds, the austenite transformation becomes insufficient and sometimes 60% or more of tempered martensite cannot be obtained.

$$A_3(° C.)=910-203\sqrt{C}+44.7Si-30Mn-20Cu-15.2Ni-11Cr+31.5Mo-400Ti+104V+400Al \quad \text{(formula 1)}$$

Here, in formula 1, C, Si, Mn, Cu, Ni, Cr, Mo, Ti, V, and Al are the contents of the elements (mass %).

After the above heating process, furthermore, a cooling process is performed for cooling the cold rolled steel sheet down to a cooling stop temperature of less than the Ms point calculated by the following formula 2 by a 10° C./s or more average cooling speed. In this cooling process, martensite can be obtained. The lower the cooling stop temperature, the greater the amount of martensite obtained. With an average cooling speed of the cooling process of less than 10° C./s, during the cooling, ferrite, pearlite, and bainite are formed and the desired amount of martensite becomes difficult to obtain. If the cooling stop temperature is the Ms point or more, martensite cannot be obtained, at the next dwelling process, the finally obtained amount of tempered martensite becomes less than 60%, and the strength of the cold rolled steel sheet becomes difficult to sufficiently raise.

$$Ms(° C.)=541-474C-15Si-35Mn-17Cr-17Ni+19Al \quad \text{(formula 2)}$$

Here, in formula 2, C, Si, Mn, Cu, Ni, Cr, Mo, Ti, V, and Al are the contents of the elements (mass %).

Next, the steel sheet is made to dwell at 200° C. or more and 500° C. or less in temperature region for 5 seconds or more and 600 seconds or less. In this dwelling process, the martensite formed in the above cooling process is tempered and becomes tempered martensite. With a dwell temperature of less than 200° C., the tempering has a hard time proceeding. On the other hand, with a dwell temperature of more than 500° C., the tempering excessively proceeds and it becomes difficult to sufficiently raise the strength of the steel sheet. Further, with a dwell time of less than 5 seconds, the tempering has a hard time sufficiently proceeding. On the other hand, with a dwell time of more than 600 seconds, the tempering excessively proceeds and it becomes difficult to sufficiently raise the strength of the steel sheet.

Between the above heating process and cooling process, a preliminary cooling process may be provided in accordance with need.

In the preliminary cooling process, the cold rolled steel sheet is made to dwell from the holding temperature at the heating process to the preliminary cooling stop temperature of the Bs point calculated by the following formula 3 or more for 5 seconds or more and 400 seconds or less. The preliminary cooling stop temperature is preferably the Bs point or more and $A_3$ point $-20°$ C. or less, more preferably the Bs point $+50°$ C. or more and $A_3$ point $-50°$ C. or less. The ferrite fraction can be controlled by this preliminary cooling stop temperature. The preliminary cooling process is performed in accordance with the required ferrite fraction. With a preliminary cooling stop temperature of less than the Bs point in temperature, the transformation to bainite becomes remarkable and it becomes difficult to make the ferrite fraction the desired range. On the other hand, with a preliminary cooling stop temperature of $A_3$ point $-20°$ C. or more, ferrite becomes difficult to form. Further, with a dwell time of less than 5 seconds, ferrite becomes difficult to form. On the other hand, with a dwell time of more than 400 seconds, sometimes ferrite is excessively formed.

$$Bs(°C.)=732-202C+216Si-85Mn-37Ni-47Cr-39Mo \quad \text{(formula 3)}$$

Here, in formula 3, C, Si, Mn, Ni, Cr, and Mo are the contents of the elements (mass %).

Further, as the tempering of the martensite, a separate tempering treatment may be performed after the annealing process ends. For example, the tempering treatment may be performed at $200°$ C. or more and $500°$ C. or less in temperature for 5 seconds or more.

Further, electroplating treatment, vapor deposition plating treatment, or other plating treatment may be performed on the above cold rolled steel sheet. Further, alloying treatment may be performed after that plating treatment. Further, the above cold rolled steel sheet may also be formed with an organic coating film, laminated by a film, treated by organic salts or inorganic salts, treated by a nonchrome process, or otherwise treated on its surface.

If hot dip galvanizing the cold rolled steel sheet as plating treatment, after the above dwelling process, for example, the cold rolled steel sheet is heated or cooled at a temperature of $40°$ C. lower than the temperature of the galvanization bath and of a temperature of $50°$ C. higher than the temperature of the galvanization bath and the cold rolled steel sheet is passed through a galvanization bath. Due to such hot dip galvanization, a cold rolled steel sheet provided with a hot dip galvanized layer on its surface, that is, a hot dip galvanized steel sheet, is obtained. The hot dip galvanized layer, for example, has a chemical composition of Fe: 7 mass % or more and 15 mass % or less and a balance: Zn, Al, and impurities. Further, the hot dip galvanized layer may also be a zinc alloy.

If performing alloying treatment after the hot dip galvanization, for example, the hot dip galvanized steel sheet is heated to $460°$ C. or more and $600°$ C. or less in temperature. If this temperature is less than $460°$ C., sometimes the alloying is insufficient. If this temperature is more than $600°$ C., sometimes the alloying is excessive and the corrosion resistance deteriorates. Due to the alloying treatment, steel sheet provided with a hot dip galvannealed layer on its surface, that is, a hot dip galvannealed steel sheet, is obtained.

Note that, after the annealing or after the plating treatment, skin-pass rolling may be performed in accordance with need.

The above embodiments all just show specific illustrations of the time when working the present invention. The technical scope of the present invention must not be interpreted limitatively due to this. That is, the present invention can be worked in various ways without departing from its technical idea or its main features.

EXAMPLES

Base steel sheets for forming the central part of sheet thickness and surface layer-use steel sheets for forming the surface soft parts were prepared. The surface layer-use steel sheets were placed on single sides or both sides of the base steel sheets to form multilayer sheets. The constituents of the central parts of sheet thicknesses of the steel sheets obtained by processing such multilayer sheets as later explained are shown in Table 1 and Table 2 while the constituents of the surface soft parts are shown in Table 3 and Table 4. Which of single sides or both sides of the central parts of sheet thicknesses the surface soft parts are placed at are described in the later explained Table 11 to Table 13.

TABLE 1

| Chem. comp. | C | Si | Mn | P | S | Al | N | O | Cr | Mo | B | Ti | Nb | V | Cu | Ni | Ca | Mg | REM |
|---|---|---|---|---|---|---|---|---|---|---|---|---|---|---|---|---|---|---|---|
| A | 0.15 | 1.40 | 2.00 | 0.03 | 0.002 | 0.030 | 0.0006 | 0.0027 | 0.300 | 0.100 | 0.0020 | | | | | | | | |
| B | 0.15 | 1.80 | 2.10 | 0.01 | 0.040 | 0.030 | 0.0006 | 0.0020 | | 0.020 | | | | | | | | | |
| C | 0.25 | 1.50 | 3.00 | 0.03 | 0.030 | 0.030 | 0.0006 | 0.0019 | | | | | | | | | | | |
| D | 0.22 | 0.20 | 3.10 | 0.02 | 0.001 | 0.030 | 0.0006 | 0.0038 | | | | 0.020 | | | 0.05 | | | | |
| E | 0.12 | 0.80 | 3.10 | 0.04 | 0.001 | 0.030 | 0.0006 | 0.0017 | | 0.100 | 0.0020 | | | | | | | | |
| F | 0.15 | 2.20 | 2.00 | 0.02 | 0.001 | 0.030 | 0.0006 | 0.0035 | | | | | 0.030 | | | | | | |
| G | 0.17 | 2.50 | 2.00 | 0.01 | 0.001 | 0.030 | 0.0006 | 0.0020 | | | | | | | | 0.01 | | | |
| H | 0.16 | 1.50 | 1.60 | 0.06 | 0.002 | 0.030 | 0.0006 | 0.0055 | 0.300 | | 0.0020 | | | | | | | | |
| I | 0.13 | 1.40 | 3.80 | 0.03 | 0.010 | 0.030 | 0.0006 | 0.0035 | | | | | | | | | 0.01 | | |
| J | 0.26 | 1.80 | 6.80 | 0.01 | 0.020 | 0.030 | 0.0006 | 0.0022 | | | | | | | | | | | |
| K | 0.15 | 1.70 | 8.90 | 0.01 | 0.030 | 0.030 | 0.0006 | 0.0039 | | | | | | | | | | | |
| L | 0.15 | 2.40 | 3.70 | 0.03 | 0.050 | 0.030 | 0.0006 | 0.0009 | | | | | | | | | | | 0.01 |
| M | 0.12 | 2.30 | 4.00 | 0.01 | 0.040 | 0.030 | 0.0006 | 0.0055 | 0.300 | | | | | | | | | | |
| N | 0.11 | 2.10 | 3.40 | 0.01 | 0.010 | 0.030 | 0.0006 | 0.0011 | | 0.050 | | | | | | | | | |
| O | 0.27 | 2.10 | 3.00 | 0.01 | 0.030 | 0.030 | 0.0006 | 0.0025 | | 0.100 | | | | | | | | | |
| P | 0.19 | 1.70 | 3.40 | 0.01 | 0.010 | 0.030 | 0.0006 | 0.0046 | | | 0.0020 | | | | | 0.3 | | | |
| Q | 0.14 | 2.00 | 3.90 | 0.01 | 0.020 | 0.030 | 0.0006 | 0.0043 | | | | | 0.030 | | 0.10 | | | | |
| R | 0.12 | 2.40 | 2.00 | 0.02 | 0.010 | 0.030 | 0.0006 | 0.0040 | 0.300 | | | | 0.030 | | | 0.20 | 0.1 | | |
| S | 0.16 | 2.50 | 2.80 | 0.01 | 0.010 | 0.030 | 0.0006 | 0.0038 | | 0.050 | | 0.020 | | 0.02 | | | | | |
| T | 0.21 | 1.60 | 3.20 | 0.01 | 0.020 | 0.030 | 0.0006 | 0.0002 | | | | | | 0.06 | | | | | |

TABLE 1-continued

| Chem. comp. | C | Si | Mn | P | S | Al | N | O | Cr | Mo | B | Ti | Nb | V | Cu | Ni | Ca | Mg | REM |
|---|---|---|---|---|---|---|---|---|---|---|---|---|---|---|---|---|---|---|---|
| U | 0.16 | 1.60 | 3.90 | 0.01 | 0.020 | 0.030 | 0.0006 | 0.0039 | 0.200 | 0.100 | 0.0015 | 0.020 | 0.020 | | | | | | |
| V | 0.08 | 1.20 | 2.40 | 0.02 | 0.001 | 0.020 | 0.0008 | 0.0018 | | | | | | | | | | | 0.02 |
| W | 0.35 | 1.20 | 2.00 | 0.02 | 0.001 | 0.020 | 0.0006 | 0.0020 | | | | | | | | | | | |
| X | 0.25 | 0.05 | 2.60 | 0.02 | 0.001 | 0.020 | 0.0006 | 0.0028 | | | | | | | | | | | |
| Y | 0.25 | 2.80 | 2.60 | 0.02 | 0.001 | 0.020 | 0.0007 | 0.0045 | | | | | | | | | | | |
| Z | 0.25 | 1.20 | 0.05 | 0.02 | 0.001 | 0.020 | 0.0007 | 0.0019 | | | | | | | | | | | |

TABLE 2

| Chem. comp. | C | Si | Mn | P | S | Al | N | O | Cr |
|---|---|---|---|---|---|---|---|---|---|
| AA | 0.25 | 1.20 | 10.50 | 0.02 | 0.001 | 0.020 | 0.0006 | 0.0028 | |
| AB | 0.25 | 1.20 | 2.10 | 0.15 | 0.001 | 0.020 | 0.0006 | 0.0019 | |
| AC | 0.25 | 1.20 | 2.70 | 0.02 | 0.060 | 0.020 | 0.0006 | 0.0029 | |
| AD | 0.25 | 1.20 | 3.20 | 0.02 | 0.001 | 2.600 | 0.0006 | 0.0004 | |
| AE | 0.25 | 1.20 | 3.40 | 0.02 | 0.001 | 0.020 | 0.0150 | 0.0030 | |
| AF | 0.25 | 1.20 | 1.60 | 0.02 | 0.001 | 0.020 | 0.0006 | 0.0080 | |
| AG | 0.25 | 1.20 | 1.60 | 0.02 | 0.001 | 0.020 | 0.0006 | 0.0021 | 5.300 |
| AH | 0.25 | 1.20 | 1.80 | 0.02 | 0.001 | 0.020 | 0.0006 | 0.0035 | |
| AI | 0.25 | 1.20 | 3.20 | 0.02 | 0.001 | 0.020 | 0.0005 | 0.0053 | |
| AJ | 0.25 | 1.20 | 3.10 | 0.02 | 0.001 | 0.020 | 0.0006 | 0.0035 | |
| AK | 0.25 | 1.20 | 2.50 | 0.02 | 0.001 | 0.020 | 0.0004 | 0.0045 | |
| AL | 0.25 | 1.20 | 2.80 | 0.02 | 0.001 | 0.020 | 0.0004 | 0.0023 | |
| AM | 0.25 | 1.20 | 2.70 | 0.02 | 0.001 | 0.020 | 0.0006 | 0.0033 | |
| AN | 0.25 | 1.20 | 3.00 | 0.02 | 0.001 | 0.020 | 0.0005 | 0.0013 | |
| AO | 0.25 | 1.20 | 3.00 | 0.02 | 0.001 | 0.020 | 0.0005 | 0.0029 | |
| AP | 0.25 | 1.20 | 3.00 | 0.02 | 0.001 | 0.020 | 0.0005 | 0.0021 | |
| AQ | 0.25 | 1.20 | 2.90 | 0.02 | 0.001 | 0.020 | 0.0005 | 0.0009 | |
| AR | 0.25 | 1.80 | 2.60 | 0.01 | 0.040 | 0.030 | 0.0006 | 0.0010 | |
| AS | 0.18 | 1.30 | 2.50 | 0.01 | 0.001 | 0.040 | 0.0007 | 0.0005 | |

| Chem. comp. | Mo | B | Ti | Nb | V | Cu | Ni | Ca | Mg | REM |
|---|---|---|---|---|---|---|---|---|---|---|
| AA | | | | | | | | | | |
| AB | | | | | | | | | | |
| AC | | | | | | | | | | |
| AD | | | | | | | | | | |
| AE | | | | | | | | | | |
| AF | | | | | | | | | | |
| AG | | | | | | | | | | |
| AH | 1.200 | | | | | | | | | |
| AI | | 0.0150 | | | | | | | | |
| AJ | | | 0.350 | | | | | | | |
| AK | | | | 0.350 | | | | | | |
| AL | | | | | 0.60 | | | | | |
| AM | | | | | | 1.50 | | | | |
| AN | | | | | | | 1.5 | | | |
| AO | | | | | | | | 0.050 | | |
| AP | | | | | | | | | 0.05 | |
| AQ | | | | | | | | | | 0.05 |
| AR | 0.500 | 0.0020 | | | | | | | | |
| AS | | | 0.020 | | | | | | | |

TABLE 3

| | Surface soft part (mass %) | | | | | | | | | |
|---|---|---|---|---|---|---|---|---|---|---|
| Chem. comp. | C | Si | Mn | P | S | Al | N | O | Cr | Mo |
| A | 0.05 | 0.50 | 1.20 | 0.01 | 0.001 | 0.020 | 0.0003 | 0.0010 | | |
| B | 0.05 | 0.50 | 1.20 | 0.01 | 0.001 | 0.020 | 0.0003 | 0.0036 | | |
| C | 0.05 | 0.50 | 1.20 | 0.01 | 0.001 | 0.020 | 0.0003 | 0.0003 | | |
| D | 0.05 | 0.50 | 1.20 | 0.01 | 0.001 | 0.020 | 0.0003 | 0.0032 | 0.100 | |
| E | 0.05 | 0.50 | 1.20 | 0.01 | 0.001 | 0.020 | 0.0003 | 0.0031 | | |
| F | 0.05 | 0.50 | 1.20 | 0.01 | 0.001 | 0.020 | 0.0003 | 0.0002 | | |
| G | 0.05 | 0.50 | 1.20 | 0.01 | 0.001 | 0.020 | 0.0003 | 0.0021 | | 0.050 |
| H | 0.05 | 0.50 | 1.20 | 0.01 | 0.001 | 0.020 | 0.0003 | 0.0028 | | |
| I | 0.05 | 0.50 | 1.20 | 0.01 | 0.001 | 0.020 | 0.0003 | 0.0005 | | |
| J | 0.05 | 1.20 | 2.30 | 0.01 | 0.001 | 0.020 | 0.0003 | 0.0053 | | |
| K | 0.05 | 1.20 | 2.30 | 0.01 | 0.001 | 0.020 | 0.0003 | 0.0030 | | |

TABLE 3-continued

| Chem. comp. | C | Si | Mn | P | S | Al | N | O |
|---|---|---|---|---|---|---|---|---|
| L | 0.05 | 1.20 | 2.30 | 0.01 | 0.001 | 0.020 | 0.0003 | 0.0050 |
| M | 0.05 | 1.20 | 2.30 | 0.01 | 0.001 | 0.020 | 0.0003 | 0.0017 |
| N | 0.05 | 1.20 | 2.30 | 0.01 | 0.001 | 0.020 | 0.0003 | 0.0049 |
| O | 0.05 | 1.20 | 2.30 | 0.01 | 0.001 | 0.020 | 0.0003 | 0.0039 |
| P | 0.05 | 1.20 | 2.30 | 0.01 | 0.001 | 0.020 | 0.0003 | 0.0018 |
| Q | 0.05 | 1.20 | 2.30 | 0.01 | 0.001 | 0.020 | 0.0003 | 0.0024 |
| R | 0.05 | 1.20 | 2.30 | 0.01 | 0.001 | 0.020 | 0.0003 | 0.0015 |
| S | 0.05 | 1.20 | 2.30 | 0.01 | 0.001 | 0.020 | 0.0003 | 0.0023 |
| T | 0.05 | 1.20 | 2.30 | 0.01 | 0.001 | 0.020 | 0.0003 | 0.0030 |
| U | 0.05 | 1.20 | 2.30 | 0.01 | 0.001 | 0.020 | 0.0003 | 0.0027 |
| V | 0.05 | 1.20 | 2.30 | 0.01 | 0.001 | 0.020 | 0.0003 | 0.0024 |
| W | 0.05 | 1.20 | 2.30 | 0.01 | 0.001 | 0.020 | 0.0003 | 0.0050 |
| X | 0.05 | 1.20 | 2.30 | 0.01 | 0.001 | 0.020 | 0.0003 | 0.0051 |
| Y | 0.07 | 0.40 | 2.10 | 0.01 | 0.001 | 0.020 | 0.0003 | 0.0026 |
| Z | 0.07 | 0.40 | 2.10 | 0.01 | 0.001 | 0.020 | 0.0003 | 0.0018 |

| | Surface soft part (mass %) | | | | | | | | |
|---|---|---|---|---|---|---|---|---|---|
| Chem. comp. | B | Ti | Nb | V | Cu | Ni | Ca | Mg | REM | Remarks |
| A | | | | | | | | | | Ex. |
| B | | 0.030 | | | | | | | | Ex. |
| C | | | | | | 0.1 | | | | Ex. |
| D | | | | | | | | | | Ex. |
| E | | | 0.020 | | | | | | | Ex. |
| F | 0.0020 | | | | | | | | | Ex. |
| G | | | | | | | | | | Ex. |
| H | | | | | | | 0.010 | 0.01 | | Ex. |
| I | | | | 0.30 | | | | | | Ex. |
| J | | | | | 0.10 | | | | | Ex. |
| K | | | | | | | | | 0.01 | Ex. |
| L | | | | | | | | | | Ex. |
| M | | | | | | | | | | Ex. |
| N | | | | | | | | | | Ex. |
| O | | | | | | | | | | Ex. |
| P | | | | | | | | | | Ex. |
| Q | | | | | | | | | | Ex. |
| R | | | | | | | | | | Ex. |
| S | | | | | | | | | | Ex. |
| T | | | | | | | | | | Ex. |
| U | | | | | | | | | | Ex. |
| V | | | | | | | | | | Comp. ex. |
| W | | | | | | | | | | Comp. ex. |
| X | | | | | | | | | | Comp. ex. |
| Y | | | | | | | | | | Comp. ex. |
| Z | | | | | | | | | | Comp. ex. |

TABLE 4

| | Surface soft part (mass %) | | | | | | | | | | | | | | | | | | | |
|---|---|---|---|---|---|---|---|---|---|---|---|---|---|---|---|---|---|---|---|---|
| Chem. comp. | C | Si | Mn | P | S | Al | N | O | Cr | Mo | B | Ti | Nb | V | Cu | Ni | Ca | Mg | REM | Remarks |
| AA | 0.07 | 0.40 | 2.10 | 0.01 | 0.001 | 0.020 | 0.0003 | 0.0009 | | | | | | | | | | | | Comp. ex. |
| AB | 0.07 | 0.40 | 2.10 | 0.01 | 0.001 | 0.020 | 0.0003 | 0.0006 | | | | | | | | | | | | Comp. ex. |
| AC | 0.07 | 0.40 | 2.10 | 0.01 | 0.001 | 0.020 | 0.0003 | 0.0022 | | | | | | | | | | | | Comp. ex. |
| AD | 0.07 | 0.40 | 2.10 | 0.01 | 0.001 | 0.020 | 0.0003 | 0.0039 | | | | | | | | | | | | Comp. ex. |
| AE | 0.07 | 0.40 | 2.10 | 0.01 | 0.001 | 0.020 | 0.0003 | 0.0003 | | | | | | | | | | | | Comp. ex. |
| AF | 0.07 | 0.40 | 2.10 | 0.01 | 0.001 | 0.020 | 0.0003 | 0.0040 | | | | | | | | | | | | Comp. ex. |
| AG | 0.07 | 1.20 | 1.40 | 0.01 | 0.001 | 0.020 | 0.0004 | 0.0047 | | | | | | | | | | | | Comp. ex. |
| AH | 0.07 | 1.20 | 1.40 | 0.01 | 0.001 | 0.020 | 0.0004 | 0.0048 | | | | | | | | | | | | Comp. ex. |
| AI | 0.07 | 1.20 | 1.40 | 0.01 | 0.001 | 0.020 | 0.0004 | 0.0009 | | | | | | | | | | | | Comp. ex. |
| AJ | 0.07 | 1.20 | 1.40 | 0.01 | 0.001 | 0.020 | 0.0004 | 0.0032 | | | | | | | | | | | | Comp. ex. |
| AK | 0.12 | 1.20 | 1.40 | 0.01 | 0.001 | 0.020 | 0.0004 | 0.0002 | | | | | | | | | | | | Comp. ex. |
| AL | 0.12 | 1.20 | 1.40 | 0.01 | 0.001 | 0.020 | 0.0004 | 0.0041 | | | | | | | | | | | | Comp. ex. |
| AM | 0.12 | 1.20 | 1.40 | 0.01 | 0.001 | 0.020 | 0.0004 | 0.0013 | | | | | | | | | | | | Comp. ex. |
| AN | 0.12 | 1.20 | 1.40 | 0.01 | 0.001 | 0.020 | 0.0004 | 0.0020 | | | | | | | | | | | | Comp. ex. |
| AO | 0.15 | 1.20 | 1.40 | 0.01 | 0.001 | 0.020 | 0.0004 | 0.0041 | | | | | | | | | | | | Comp. ex. |
| AP | 0.15 | 1.20 | 1.40 | 0.01 | 0.001 | 0.020 | 0.0004 | 0.0012 | | | | | | | | | | | | Comp. ex. |
| AQ | 0.15 | 1.20 | 1.40 | 0.01 | 0.001 | 0.020 | 0.0004 | 0.0019 | | | | | | | | | | | | Comp. ex. |
| AR | 0.23 | 0.30 | 0.70 | 0.01 | 0.001 | 0.020 | 0.0005 | 0.0011 | | | | | | | | | | | | Ex. |
| AS | 0.18 | 0.40 | 2.20 | 0.01 | 0.001 | 0.020 | 0.0005 | 0.0017 | | | | | | | | | | | | Ex. |

The prepared multilayer sheets were hot rolled, pickled, and cold rolled under the conditions shown in Tables 5 to 7. Further, the pickling peak count (PPc) of the pickled steel sheet surfaces are shown in Tables 11 to 13. Next, the cold rolled steel sheets were annealed under the conditions described in Tables 8 to 10.

TABLE 5

| Test conditions | Remarks | Chem. comp. | Hot rolling | | | | Pickling | | Cold rolling |
|---|---|---|---|---|---|---|---|---|---|
| | | | Multilayer sheet heating temp. (° C.) | Multilayer sheet holding time (min) | Finishing end temp. (° C.) | Coiling temp. (° C.) | Pickling temp. (° C.) | Pickling time (s) | Cold rolling rate (%) |
| 1 | Ex. | A | 1200 | 100 | 950 | 550 | 90 | 500 | 68 |
| 2 | Comp. ex. | A | 1000 | 100 | 950 | 560 | 90 | 500 | 66 |
| 3 | Ex. | B | 1150 | 100 | 950 | 600 | 90 | 500 | 71 |
| 4 | Comp. ex. | B | 1280 | 50 | 950 | 530 | 90 | 500 | 73 |
| 5 | Ex. | C | 1290 | 100 | 950 | 500 | 90 | 230 | 65 |
| 6 | Comp. ex. | C | 1100 | 130 | 950 | 540 | 90 | 500 | 10 |
| 7 | Comp. ex. | C | 1150 | 230 | 950 | 250 | 90 | 500 | 90 |
| 8 | Ex. | D | 1210 | 200 | 950 | 520 | 90 | 500 | 56 |
| 9 | Comp. ex. | D | 1260 | 140 | 950 | 260 | 90 | 600 | 71 |
| 10 | Ex. | E | 1190 | 210 | 950 | 430 | 90 | 500 | 65 |
| 11 | Comp. ex. | E | 1140 | 100 | 950 | 130 | 90 | 500 | 73 |
| 12 | Ex. | F | 1270 | 110 | 940 | 340 | 90 | 500 | 70 |
| 13 | Comp. ex. | F | 1170 | 230 | 940 | 600 | 90 | 500 | 60 |
| 14 | Ex. | F | 1290 | 120 | 940 | 630 | 90 | 750 | 46 |
| 15 | Comp. ex. | F | 1150 | 180 | 940 | 360 | 90 | 500 | 64 |
| 16 | Ex. | G | 1270 | 240 | 960 | 300 | 90 | 500 | 60 |
| 17 | Comp. ex. | G | 1270 | 220 | 960 | 490 | 90 | 500 | 44 |
| 18 | Ex. | H | 1160 | 240 | 960 | 110 | 83 | 600 | 74 |
| 19 | Comp. ex. | H | 1180 | 240 | 960 | 300 | 90 | 500 | 64 |
| 20 | Ex. | I | 1270 | 140 | 930 | 350 | 90 | 500 | 72 |
| 21 | Comp. ex. | I | 1110 | 220 | 930 | 380 | 90 | 500 | 53 |
| 22 | Comp. ex. | I | 1190 | 180 | 930 | 170 | 90 | 500 | 49 |
| 23 | Ex. | J | 1150 | 180 | 970 | 310 | 95 | 420 | 54 |
| 24 | Comp. ex. | J | 1280 | 160 | 970 | 500 | 90 | 500 | 40 |
| 25 | Ex. | K | 1260 | 80 | 890 | 250 | 90 | 500 | 61 |
| 26 | Ex. | K | 1270 | 90 | 890 | 580 | 90 | 500 | 57 |

TABLE 6

| Test conditions | Remarks | Chem. comp. | Hot rolling | | | | Pickling | | Cold rolling |
|---|---|---|---|---|---|---|---|---|---|
| | | | Multilayer sheet heating temp. (° C.) | Multilayer sheet holding time (min) | Finishing end temp. (° C.) | Coiling temp. (° C.) | Pickling temp. (° C.) | Pickling time (s) | Cold rolling rate (%) |
| 27 | Ex. | L | 1210 | 130 | 900 | 480 | 90 | 500 | 67 |
| 28 | Comp. ex. | L | 1170 | 210 | 900 | 380 | 90 | 500 | 63 |
| 29 | Comp. ex. | L | 1290 | 150 | 900 | 150 | 90 | 500 | 74 |
| 30 | Comp. ex. | L | 1190 | 230 | 900 | 310 | 90 | 500 | 62 |
| 31 | Ex. | M | 1100 | 170 | 950 | 200 | 90 | 500 | 62 |
| 32 | Ex. | M | 1290 | 80 | 950 | 620 | 90 | 500 | 46 |
| 33 | Ex. | N | 1200 | 60 | 890 | 340 | 90 | 500 | 50 |
| 34 | Ex. | N | 1150 | 150 | 890 | 250 | 90 | 500 | 72 |
| 35 | Ex. | O | 1080 | 160 | 900 | 370 | 90 | 500 | 73 |
| 36 | Ex. | O | 1110 | 110 | 900 | 610 | 90 | 500 | 45 |
| 37 | Ex. | P | 1160 | 120 | 920 | 410 | 90 | 650 | 42 |
| 38 | Ex. | P | 1150 | 140 | 920 | 100 | 90 | 500 | 58 |
| 39 | Ex. | Q | 1120 | 80 | 950 | 110 | 90 | 500 | 66 |
| 40 | Ex. | Q | 1080 | 220 | 930 | 660 | 94 | 430 | 74 |
| 41 | Ex. | R | 1150 | 60 | 940 | 220 | 90 | 500 | 53 |
| 42 | Ex. | R | 1240 | 130 | 920 | 660 | 90 | 500 | 59 |
| 43 | Ex. | S | 1170 | 120 | 980 | 560 | 90 | 500 | 44 |
| 44 | Ex. | S | 1140 | 170 | 970 | 110 | 90 | 500 | 55 |
| 45 | Ex. | T | 1190 | 110 | 980 | 410 | 90 | 500 | 69 |
| 46 | Ex. | T | 1250 | 210 | 960 | 660 | 90 | 500 | 63 |
| 47 | Ex. | U | 1230 | 250 | 940 | 520 | 90 | 500 | 73 |
| 48 | Ex. | U | 1120 | 200 | 930 | 620 | 90 | 500 | 62 |
| 49 | Comp. ex. | V | 1200 | 100 | 940 | 100 | 90 | 500 | 69 |
| 50 | Comp. ex. | W | 1100 | 150 | 930 | 370 | 90 | 500 | 40 |

TABLE 6-continued

| | | | Hot rolling | | | | Pickling | | Cold rolling |
|---|---|---|---|---|---|---|---|---|---|
| | | | Multilayer sheet | Multilayer sheet | | | | | |
| Test conditions | Remarks | Chem. comp. | heating temp. (° C.) | holding time (min) | Finishing end temp. (° C.) | Coiling temp. (° C.) | Pickling temp. (° C.) | Pickling time (s) | Cold rolling rate (%) |
| 51 | Comp. ex. | X | 1210 | 60 | 900 | 280 | 90 | 500 | 43 |
| 52 | Comp. ex. | Y | 1100 | 140 | 930 | 480 | 90 | 500 | 72 |
| 53 | Comp. ex. | Z | 1240 | 160 | 940 | 150 | 90 | 500 | 59 |

TABLE 7

| | | | Hot rolling | | | | Pickling | | Cold rolling |
|---|---|---|---|---|---|---|---|---|---|
| | | | Multilayer sheet | Multilayer sheet | | | | | |
| Test conditions | Remarks | Chem. comp. | heating temp. (° C.) | holding time (min) | Finishing end temp. (° C.) | Coiling temp. (° C.) | Pickling temp. (° C.) | Pickling time (s) | Cold rolling rate (%) |
| 54 | Comp. ex. | AA | 1090 | 70 | 90 | 120 | 90 | 500 | 46 |
| 55 | Comp. ex. | AB | 1270 | 240 | 950 | 130 | 90 | 500 | 75 |
| 56 | Comp. ex. | AC | 1280 | 180 | 950 | 620 | 90 | 500 | 74 |
| 57 | Comp. ex. | AD | 1210 | 140 | 960 | 260 | 90 | 500 | 65 |
| 58 | Comp. ex. | AE | 1160 | 250 | 950 | 220 | 90 | 500 | 56 |
| 59 | Comp. ex. | AF | 1170 | 140 | 930 | 640 | 90 | 500 | 56 |
| 60 | Comp. ex. | AG | 1150 | 200 | 930 | 590 | 90 | 500 | 50 |
| 61 | Comp. ex. | AH | 1130 | 80 | 880 | 670 | 90 | 500 | 64 |
| 62 | Comp. ex. | AI | 1160 | 130 | 80 | 460 | 90 | 500 | 70 |
| 63 | Comp. ex. | AJ | 1080 | 60 | 870 | 510 | 90 | 500 | 59 |
| 64 | Comp. ex. | AK | 1260 | 250 | 870 | 460 | 90 | 500 | 49 |
| 65 | Comp. ex. | AL | 1170 | 240 | 940 | 440 | 90 | 500 | 70 |
| 66 | Comp. ex. | AM | 1180 | 110 | 950 | 140 | 90 | 500 | 50 |
| 67 | Comp. ex. | AN | 1160 | 200 | 960 | 600 | 90 | 500 | 50 |
| 68 | Comp. ex. | AO | 1230 | 80 | 960 | 520 | 90 | 500 | 49 |
| 69 | Comp. ex. | AP | 1080 | 110 | 940 | 520 | 90 | 500 | 74 |
| 70 | Comp. ex. | AQ | 1180 | 110 | 930 | 510 | 90 | 500 | 50 |
| 71 | Ex. | AR | 1110 | 70 | 920 | 490 | 90 | 500 | 47 |
| 72 | Comp. ex. | AS | 1150 | 180 | 920 | 270 | 90 | 500 | 63 |
| 73 | Comp. ex. | A | 1200 | 100 | 950 | 550 | 90 | 500 | 68 |

TABLE 8

| | | Annealing process | | | | | | |
|---|---|---|---|---|---|---|---|---|
| | | Heating process | | Preliminary cooling process | | | Cooling process | |
| | | | | | Prelim. cooling | Dwell time | | |
| Test conditions | Remarks | Heating temp. (° C.) | Heating holding time (s) | Presence of prelim. cooling | stop temp. (° C.) | during prelim. cooling (s) | Cooling speed (° C./s) | Cooling stop temp. (° C.) |
| 1 | Ex. | 850 | 70 | No | — | — | 49 | 270 |
| 2 | Comp. ex. | 860 | 120 | No | — | — | 10 | 290 |
| 3 | Ex. | 810 | 50 | No | — | — | 39 | 270 |
| 4 | Comp. ex. | 850 | 140 | No | — | — | 55 | 280 |
| 5 | Ex. | 830 | 140 | No | — | — | 50 | 200 |
| 6 | Comp. ex. | 830 | 140 | No | — | — | 50 | 200 |
| 7 | Comp. ex. | 830 | 140 | No | — | — | 50 | 200 |
| 8 | Ex. | 850 | 170 | No | — | — | 60 | 246 |
| 9 | Comp. ex. | 730 | 110 | No | — | — | 38 | 240 |
| 10 | Ex. | 910 | 100 | No | — | — | 25 | 244 |
| 11 | Comp. ex. | 820 | 3 | No | — | — | 32 | 254 |
| 12 | Ex. | 910 | 80 | Yes | 650 | — | 37 | 270 |
| 13 | Comp. ex. | 870 | 90 | Yes | 500 | — | 20 | 260 |
| 14 | Ex. | 850 | 120 | Yes | 650 | 200 | 37 | 230 |

TABLE 8-continued

| | | | | | | | | |
|---|---|---|---|---|---|---|---|---|
| 15 | Comp. ex. | 810 | 100 | Yes | 650 | 500 | 54 | 240 |
| 16 | Ex. | 810 | 140 | No | — | — | 25 | 243 |
| 17 | Comp. ex. | 840 | 20 | No | — | — | 5 | 240 |
| 18 | Ex. | 860 | 130 | No | — | — | 58 | 250 |
| 19 | Comp. ex. | 870 | 40 | No | — | — | 35 | 437 |
| 20 | Ex. | 860 | 170 | No | — | — | 60 | 240 |
| 21 | Comp. ex. | 810 | 130 | No | — | — | 19 | 220 |
| 22 | Comp. ex. | 820 | 60 | No | — | — | 16 | 230 |
| 23 | Ex. | 910 | 40 | No | — | — | 41 | 33 |
| 24 | Comp. ex. | 870 | 40 | No | — | — | 58 | 113 |
| 25 | Ex. | 820 | 150 | No | — | — | 15 | 93 |
| 26 | Ex. | 910 | 170 | No | — | — | 32 | 93 |

| | Annealing process | | Plating process | | Tempering process | | |
|---|---|---|---|---|---|---|---|
| | Dwelling process | | | | Presence of later process of tempering | Tempering temp. (° C.) | Tempering time (s) |
| Test conditions | Dwell temp. (° C.) | Dwell time (s) | Presence of plating | Presence of alloying | | | |
| 1 | 260 | 480 | No | No | No | — | — |
| 2 | 290 | 430 | No | No | No | — | — |
| 3 | 420 | 280 | No | No | No | — | — |
| 4 | 240 | 170 | No | No | No | — | — |
| 5 | 300 | 80 | No | No | No | — | — |
| 6 | 300 | 80 | No | No | No | — | — |
| 7 | 300 | 80 | No | No | No | — | — |
| 8 | 330 | 20 | No | No | No | — | — |
| 9 | 420 | 360 | No | No | No | — | — |
| 10 | 460 | 210 | No | No | No | — | — |
| 11 | 260 | 450 | No | No | No | — | — |
| 12 | 390 | 310 | No | No | No | — | — |
| 13 | 260 | 420 | No | No | No | — | — |
| 14 | 300 | 390 | No | No | No | — | — |
| 15 | 480 | 400 | No | No | No | — | — |
| 16 | 330 | 170 | No | No | No | — | — |
| 17 | 370 | 160 | No | No | No | — | — |
| 18 | 330 | 190 | No | No | No | — | — |
| 19 | 240 | 120 | No | No | No | — | — |
| 20 | 300 | 490 | No | No | No | — | — |
| 21 | 100 | 390 | No | No | No | — | — |
| 22 | 600 | 440 | No | No | No | — | — |
| 23 | 320 | 100 | No | No | No | — | — |
| 24 | 440 | 3 | No | No | No | — | — |
| 25 | 440 | 250 | Yes | No | No | — | — |
| 26 | 480 | 160 | Yes | Yes | No | — | — |

TABLE 9

| | | Annealing process | | | | | | |
|---|---|---|---|---|---|---|---|---|
| | | Heating process | | Preliminary cooling process | | | Cooling process | |
| | | | Heating | | Prelim. | Dwell time | | |
| Test conditions | Remarks | Heating temp. (° C.) | holding time (s) | Presence of prelim. cooling | cooling stop temp. (° C.) | during prelim. cooling (s) | Cooling speed (° C./s) | Cooling stop temp. (° C.) |
| 27 | Ex. | 850 | 60 | No | — | — | 10 | 196 |
| 28 | Comp. ex. | 910 | 160 | No | — | — | 10 | 196 |
| 29 | Comp. ex. | 840 | 60 | No | — | — | 26 | 216 |
| 30 | Comp. ex. | 900 | 80 | No | — | — | 57 | 200 |
| 31 | Ex. | 870 | 140 | No | — | — | 21 | 285 |
| 32 | Ex. | 860 | 140 | No | — | — | 26 | 315 |
| 33 | Ex. | 910 | 80 | No | — | — | 41 | 219 |
| 34 | Ex. | 840 | 180 | No | — | — | 23 | 219 |
| 35 | Ex. | 830 | 130 | No | — | — | 33 | 157 |
| 36 | Ex. | 810 | 180 | No | — | — | 13 | 177 |
| 37 | Ex. | 810 | 80 | No | — | — | 25 | 202 |
| 38 | Ex. | 810 | 30 | No | — | — | 15 | 222 |
| 39 | Ex. | 860 | 110 | No | — | — | 22 | 229 |
| 40 | Ex. | 820 | 50 | No | — | — | 16 | 189 |

TABLE 9-continued

| | | | | | | | | |
|---|---|---|---|---|---|---|---|---|
| 41 | Ex. | 850 | 80 | No | — | — | 24 | 240 |
| 42 | Ex. | 870 | 30 | No | — | — | 10 | 272 |
| 43 | Ex. | 890 | 100 | No | — | — | 25 | 150 |
| 44 | Ex. | 890 | 20 | No | — | — | 38 | 250 |
| 45 | Ex. | 870 | 130 | No | — | — | 29 | 196 |
| 46 | Ex. | 820 | 20 | No | — | — | 14 | 180 |
| 47 | Ex. | 850 | 20 | No | — | — | 28 | 222 |
| 48 | Ex. | 830 | 60 | No | — | — | 31 | 150 |
| 49 | Comp. ex. | 870 | 80 | No | — | — | 26 | 381 |
| 50 | Comp. ex. | 870 | 90 | No | — | — | 41 | 177 |
| 51 | Comp. ex. | 910 | 130 | No | — | — | 11 | 271 |
| 52 | Comp. ex. | 870 | 140 | No | — | — | 10 | 200 |
| 53 | Comp. ex. | 830 | 40 | No | — | — | 10 | 303 |

| | Annealing process | | | | Tempering process | | |
|---|---|---|---|---|---|---|---|
| | Dwelling process | | | Presence | | | |
| | Dwell | Dwell | Plating process | | of later | Tempering | Tempering |
| Test conditions | temp. (° C.) | time (s) | Presence of plating | Presence of alloying | process of tempering | temp. (° C.) | time (s) |
| 27 | 450 | 500 | No | No | Yes | 300 | 300 |
| 28 | 330 | 300 | No | No | Yes | 100 | 300 |
| 29 | 280 | 440 | No | No | Yes | 600 | 300 |
| 30 | 440 | 30 | No | No | Yes | 300 | 3 |
| 31 | 440 | 120 | No | No | No | — | — |
| 32 | 450 | 100 | No | No | No | — | — |
| 33 | 420 | 170 | No | No | No | — | — |
| 34 | 400 | 320 | No | No | No | — | — |
| 35 | 380 | 210 | No | No | No | — | — |
| 36 | 240 | 280 | No | No | No | — | — |
| 37 | 280 | 250 | No | No | No | — | — |
| 38 | 440 | 200 | No | No | No | — | — |
| 39 | 390 | 370 | No | No | No | — | — |
| 40 | 370 | 170 | No | No | No | — | — |
| 41 | 410 | 50 | No | No | No | — | — |
| 42 | 340 | 490 | No | No | No | — | — |
| 43 | 390 | 100 | No | No | No | — | — |
| 44 | 310 | 460 | No | No | No | — | — |
| 45 | 270 | 90 | No | No | No | — | — |
| 46 | 470 | 20 | No | No | No | — | — |
| 47 | 450 | 390 | No | No | No | — | — |
| 48 | 360 | 300 | No | No | No | — | — |
| 49 | 490 | 400 | No | No | No | — | — |
| 50 | 290 | 480 | No | No | No | — | — |
| 51 | 360 | 360 | No | No | No | — | — |
| 52 | 460 | 160 | No | No | No | — | — |
| 53 | 320 | 60 | No | No | No | — | — |

TABLE 10

| | | Annealing process | | | | | | |
|---|---|---|---|---|---|---|---|---|
| | | Heating process | | Preliminary cooling process | | | Cooling process | |
| | | | Heating | | Prelim. | Dwell time | | |
| Test conditions | Remarks | Heating temp. (° C.) | holding time (s) | Presence of prelim. cooling | cooling stop temp. (° C.) | during prelim. cooling (s) | Cooling speed (° C./s) | Cooling stop temp. (° C.) |
| 54 | Comp. ex. | 810 | 40 | No | — | — | 21 | 27 |
| 55 | Comp. ex. | 840 | 30 | No | — | — | 30 | 221 |
| 56 | Comp. ex. | 890 | 130 | No | — | — | 30 | 190 |
| 57 | Comp. ex. | 840 | 100 | No | — | — | 47 | 232 |
| 58 | Comp. ex. | 860 | 30 | No | — | — | 20 | 160 |
| 59 | Comp. ex. | 890 | 140 | No | — | — | 12 | 239 |
| 60 | Comp. ex. | 880 | 60 | No | — | — | 55 | 149 |
| 61 | Comp. ex. | 850 | 100 | No | — | — | 10 | 252 |
| 62 | Comp. ex. | 910 | 110 | No | — | — | 49 | 183 |
| 63 | Comp. ex. | 900 | 100 | No | — | — | 45 | 176 |
| 64 | Comp. ex. | 890 | 140 | No | — | — | 19 | 220 |
| 65 | Comp. ex. | 870 | 70 | No | — | — | 28 | 220 |

TABLE 10-continued

| | | | | | | | | |
|---|---|---|---|---|---|---|---|---|
| 66 | Comp. ex. | 860 | 50 | No | — | — | 33 | 220 |
| 67 | Comp. ex. | 820 | 60 | No | — | — | 29 | 160 |
| 68 | Comp. ex. | 820 | 50 | No | — | — | 41 | 180 |
| 69 | Comp. ex. | 820 | 120 | No | — | — | 31 | 140 |
| 70 | Comp. ex. | 890 | 100 | No | — | — | 47 | 160 |
| 71 | Ex. | 830 | 160 | No | — | — | 27 | 100 |
| 72 | Comp. ex. | 820 | 100 | No | — | — | 47 | 120 |
| 73 | Comp. ex. | 850 | 70 | No | — | — | 49 | 270 |

| | Annealing process | | | Tempering process | | |
|---|---|---|---|---|---|---|
| | Dwelling process | | | Presence | | |
| | Dwell | Dwell | Plating process | of later | Tempering | Tempering |
| Test | temp. | time | Presence | Presence | process of | temp. | time |
| conditions | (° C.) | (s) | of plating | of alloying | tempering | (° C.) | (s) |
| 54 | 240 | 270 | No | No | No | — | — |
| 55 | 260 | 10 | No | No | No | — | — |
| 56 | 490 | 10 | No | No | No | — | — |
| 57 | 440 | 30 | No | No | No | — | — |
| 58 | 480 | 30 | No | No | No | — | — |
| 59 | 440 | 480 | No | No | No | — | — |
| 60 | 370 | 100 | No | No | No | — | — |
| 61 | 320 | 180 | No | No | No | — | — |
| 62 | 440 | 330 | No | No | No | — | — |
| 63 | 490 | 180 | No | No | No | — | — |
| 64 | 390 | 120 | No | No | No | — | — |
| 65 | 440 | 130 | No | No | No | — | — |
| 66 | 280 | 290 | No | No | No | — | — |
| 67 | 450 | 10 | No | No | No | — | — |
| 68 | 270 | 140 | No | No | No | — | — |
| 69 | 320 | 460 | No | No | No | — | — |
| 70 | 430 | 110 | No | No | No | — | — |
| 71 | 430 | 300 | No | No | No | — | — |
| 72 | 410 | 340 | No | No | No | — | — |
| 73 | 260 | 480 | No | No | No | — | — |

The positions of the surface soft parts of the obtained steel sheets, the thicknesses of the surface soft parts and central parts of sheet thicknesses, the hardnesses of the surface soft parts and central parts of sheet thicknesses, the ratios of the hardnesses of the surface soft parts and the hardnesses so the central parts of sheet thicknesses, and the ratios of the thicknesses of the surface soft parts to the thicknesses of the central parts of sheet thicknesses are shown in Tables 11 to 13.

TABLE 11

| Test cond. | Position of surface soft part | Thickness of surface soft part (mm) | Thickness of central part of sheet thickness (mm) | Hardness of surface soft part (Hv) | Hardness of central part of sheet thickness (Hv) | Hardness of surface soft part/Hardness of central part of sheet thickness | Thickness of surface soft part/Thickness of central part of sheet thickness (%) | Pickling pick count PPc of pickled steel sheet surface (/mm) |
|---|---|---|---|---|---|---|---|---|
| 1 | Both sides | 0.026 | 0.8 | 250 | 482 | 0.52 | 6.5 | 65.4 |
| 2 | Both sides | 0.013 | 0.8 | 240 | 476 | 0.50 | 3.3 | 62.6 |
| 3 | Both sides | 0.007 | 2.0 | 260 | 410 | 0.63 | 0.7 | 62.7 |
| 4 | Both sides | 0.013 | 0.8 | 260 | 485 | 0.54 | 3.3 | 64.4 |
| 5 | Both sides | 0.023 | 1.5 | 290 | 563 | 0.51 | 3.1 | 63.5 |
| 6 | Both sides | Sheet shape worsened during hot rolling, so sample unobtainable | | | | | | |
| 7 | One side | Sheet broke during cold rolling, so sample unobtainable | | | | | | |
| 8 | Both sides | 0.019 | 1.6 | 280 | 521 | 0.54 | 2.4 | 64.7 |
| 9 | Both sides | 0.029 | 1.9 | 170 | 446 | 0.38 | 3.1 | 61.2 |
| 10 | Both sides | 0.013 | 1.7 | 300 | 382 | 0.79 | 1.5 | 61.0 |
| 11 | Both sides | 0.018 | 1.7 | 180 | 454 | 0.40 | 2.1 | 64.9 |
| 12 | Both sides | 0.022 | 0.9 | 260 | 431 | 0.60 | 4.9 | 62.2 |
| 13 | Both sides | 0.011 | 1.2 | 250 | 482 | 0.52 | 1.8 | 61.6 |
| 14 | Both sides | 0.010 | 2.0 | 240 | 473 | 0.51 | 1.0 | 63.9 |
| 15 | Both sides | 0.011 | 0.9 | 190 | 358 | 0.53 | 2.4 | 64.5 |
| 16 | Both sides | 0.010 | 1.1 | 300 | 479 | 0.63 | 1.8 | 68.4 |
| 17 | Both sides | 0.011 | 1.5 | 160 | 457 | 0.35 | 1.5 | 62.9 |
| 18 | Both sides | 0.028 | 1.4 | 350 | 471 | 0.74 | 4.0 | 67.9 |
| 19 | Both sides | 0.011 | 1.5 | 280 | 380 | 0.74 | 1.5 | 62.9 |
| 20 | Both sides | 0.020 | 1.3 | 310 | 455 | 0.68 | 3.1 | 62.8 |

TABLE 11-continued

| Test cond. | Position of surface soft part | Thickness of surface soft part (mm) | Thickness of central part of sheet thickness (mm) | Hardness of surface soft part (Hv) | Hardness of central part of sheet thickness (Hv) | Hardness of surface soft part/Hardness of central part of sheet thickness | Thickness of surface soft part/Thickness of central part of sheet thickness (%) | Pickling pick count PPc of pickled steel sheet surface (/mm) |
|---|---|---|---|---|---|---|---|---|
| 21 | Both sides | 0.015 | 1.4 | 300 | 444 | 0.68 | 2.1 | 66.2 |
| 22 | Both sides | 0.008 | 1.2 | 280 | 365 | 0.77 | 1.3 | 64.0 |
| 23 | Both sides | 0.026 | 1.6 | 330 | 561 | 0.59 | 3.3 | 64.6 |
| 24 | Both sides | 0.018 | 1.9 | 290 | 440 | 0.66 | 1.9 | 70.0 |
| 25 | Both sides | 0.010 | 1.5 | 330 | 394 | 0.84 | 1.3 | 63.0 |
| 26 | Both sides | 0.024 | 1.6 | 335 | 380 | 0.88 | 3.0 | 62.9 |

15

TABLE 12

| Test cond. | Position of surface soft part | Thickness of surface soft part (mm) | Thickness of central part of sheet thickness (mm) | Hardness of surface soft part (Hv) | Hardness of central part of sheet thickness (Hv) | Hardness of surface soft part/Hardness of central part of sheet thickness | Thickness of surface soft part/Thickness of central part of sheet thickness (%) | Pickling pick count PPc of pickled steel sheet surface (/mm) |
|---|---|---|---|---|---|---|---|---|
| 27 | Both sides | 0.027 | 1.5 | 270 | 386 | 0.70 | 3.6 | 61.5 |
| 28 | Both sides | 0.012 | 1.5 | 310 | 463 | 0.67 | 1.6 | 61.0 |
| 29 | Both sides | 0.019 | 1.7 | 260 | 365 | 0.71 | 2.2 | 63.9 |
| 30 | Both sides | 0.021 | 0.9 | 330 | 418 | 0.79 | 4.7 | 66.4 |
| 31 | One side | 0.013 | 2.5 | 230 | 382 | 0.60 | 0.5 | 62.6 |
| 32 | Both sides | 0.016 | 1.0 | 230 | 386 | 0.60 | 3.2 | 63.1 |
| 33 | Both sides | 0.024 | 1.1 | 250 | 390 | 0.64 | 4.4 | 62.4 |
| 34 | Both sides | 0.015 | 1.2 | 280 | 400 | 0.70 | 2.5 | 62.5 |
| 35 | Both sides | 0.018 | 0.9 | 350 | 519 | 0.67 | 4.0 | 63.2 |
| 36 | Both sides | 0.015 | 1.6 | 290 | 575 | 0.50 | 1.9 | 61.6 |
| 37 | Both sides | 0.018 | 1.8 | 290 | 516 | 0.56 | 2.0 | 63.3 |
| 38 | Both sides | 0.028 | 2.0 | 350 | 411 | 0.85 | 2.8 | 69.0 |
| 39 | Both sides | 0.028 | 1.8 | 320 | 425 | 0.75 | 3.1 | 61.6 |
| 40 | Both sides | 0.006 | 1.0 | 270 | 436 | 0.62 | 1.2 | 64.9 |
| 41 | Both sides | 0.030 | 1.0 | 290 | 401 | 0.72 | 6.0 | 69.6 |
| 42 | Both sides | 0.005 | 1.7 | 300 | 434 | 0.69 | 0.6 | 61.8 |
| 43 | Both sides | 0.026 | 1.3 | 260 | 437 | 0.59 | 4.0 | 61.2 |
| 44 | Both sides | 0.024 | 1.2 | 260 | 479 | 0.54 | 4.0 | 64.0 |
| 45 | One side | 0.028 | 1.8 | 300 | 537 | 0.56 | 1.6 | 62.0 |
| 46 | Both sides | 0.006 | 1.1 | 300 | 383 | 0.78 | 1.1 | 63.9 |
| 47 | Both sides | 0.030 | 0.8 | 340 | 396 | 0.86 | 7.5 | 62.8 |
| 48 | Both sides | 0.023 | 0.8 | 250 | 456 | 0.55 | 5.8 | 62.3 |
| 49 | Both sides | 0.006 | 3.2 | 170 | 340 | 0.50 | 0.4 | 63.3 |
| 50 | Both sides | 0.026 | 1.4 | 320 | 650 | 0.49 | 3.7 | 63.4 |
| 51 | Both sides | 0.015 | 1.6 | 340 | 524 | 0.65 | 1.9 | 64.5 |
| 52 | Both sides | 0.010 | 0.8 | 280 | 408 | 0.69 | 2.5 | 65.6 |
| 53 | Both sides | 0.026 | 0.9 | 280 | 553 | 0.51 | 5.8 | 64.6 |

TABLE 13

| Test cond. | Position of surface soft part | Thickness of surface soft part (mm) | Thickness of central part of sheet thickness (mm) | Hardness of surface soft part (Hv) | Hardness of central part of sheet thickness (Hv) | Hardness of surface soft part/Hardness of central part of sheet thickness | Thickness of surface soft part/Thickness of central part of sheet thickness (%) | Pickling pick count PPc of pickled steel sheet surface (/mm) |
|---|---|---|---|---|---|---|---|---|
| 54 | Both sides | 0.024 | 1.9 | 300 | 581 | 0.52 | 2.5 | 63.7 |
| 55 | Both sides | 0.029 | 1.2 | 320 | 577 | 0.55 | 4.8 | 66.3 |
| 56 | Both sides | 0.029 | 1.0 | 320 | 386 | 0.83 | 5.8 | 65.7 |
| 57 | Both sides | 0.008 | 0.9 | 250 | 436 | 0.57 | 1.8 | 62.9 |
| 58 | Both sides | 0.030 | 1.0 | 300 | 388 | 0.77 | 6.0 | 64.7 |
| 59 | Both sides | 0.017 | 1.0 | 260 | 436 | 0.60 | 3.4 | 68.5 |
| 60 | Both sides | 0.013 | 1.2 | 350 | 515 | 0.68 | 2.2 | 63.5 |
| 61 | Both sides | 0.025 | 1.1 | 290 | 553 | 0.52 | 4.5 | 62.7 |
| 62 | Both sides | 0.017 | 0.8 | 340 | 436 | 0.78 | 4.3 | 63.7 |

TABLE 13-continued

| Test cond. | Position of surface soft part | Thickness of surface soft part (mm) | Thickness of central part of sheet thickness (mm) | Hardness of surface soft part (Hv) | Hardness of central part of sheet thickness (Hv) | Hardness of surface soft part/Hardness of central part of sheet thickness | Thickness of surface soft part/Thickness of central part of sheet thickness (%) | Pickling pick count PPc of pickled steel sheet surface (/mm) |
|---|---|---|---|---|---|---|---|---|
| 63 | Both sides | 0.018 | 1.3 | 260 | 387 | 0.67 | 2.8 | 63.2 |
| 64 | Both sides | 0.021 | 1.9 | 260 | 495 | 0.52 | 2.2 | 63.4 |
| 65 | Both sides | 0.017 | 1.2 | 260 | 436 | 0.60 | 2.8 | 64.0 |
| 66 | Both sides | 0.012 | 1.8 | 330 | 572 | 0.58 | 1.3 | 62.5 |
| 67 | Both sides | 0.009 | 0.9 | 350 | 422 | 0.83 | 2.0 | 64.5 |
| 68 | Both sides | 0.026 | 0.9 | 310 | 575 | 0.54 | 5.8 | 61.9 |
| 69 | Both sides | 0.010 | 0.9 | 320 | 553 | 0.58 | 2.2 | 61.4 |
| 70 | Both sides | 0.024 | 1.8 | 340 | 449 | 0.76 | 2.7 | 70.6 |
| 71 | Both sides | 0.005 | 1.5 | 550 | 575 | 0.88 | 0.7 | 64.1 |
| 72 | Both sides | 0.026 | 0.8 | 400 | 434 | 0.92 | 6.5 | 62.9 |
| 73 | Both sides | 0.026 | 0.8 | 260 | 482 | 0.54 | 6.5 | 52.1 |

Further, the microstructures of the central parts of sheet thicknesses, the carbide properties of the surface soft parts, the tensile strengths, bendabilities, and hydrogen embrittlement resistances are shown in Tables 14 to 16. The bendabilities, as explained above, were evaluated by the limit bending radius ratios R/t obtained by V-bending tests. The hydrogen embrittlement resistances, as explained above, were evaluated by imparting strain to the strip-shaped test pieces by bending, dipping the strip-shaped test pieces in an ammonium thiocyanate solution, and looking for the presence of cracking occurring. Note that, test pieces which broke at the time of bending and which were supplied for dipping in an ammonium thiocyanate solution were not used for evaluation of the hydrogen embrittlement resistance and were described as "bendability poor" in the column on hydrogen embrittlement resistance.

TABLE 14

| Test cond. | Volume percentages of microstructures of central part of sheet thickness/% | | | | | | Number density of carbides contained in surface soft part ($[\times 10^4/\text{mm}^2]$) | Average grain size of carbides contained in surface soft part (μm) |
|---|---|---|---|---|---|---|---|---|
| | Tempered martensite | Ferrite | Bainite | Pearlite | Retained austenite | As-quenched martensite | | |
| 1 | 70 | 2 | 20 | 8 | | | 2.1 | 0.20 |
| 2 | 63 | | 24 | 9 | 4 | | 0.8 | 0.18 |
| 3 | 67 | | 29 | | 4 | | 1.6 | 0.18 |
| 4 | 63 | 10 | 20 | 3 | 4 | | 0.8 | 0.19 |
| 5 | 65 | 6 | 15 | 8 | 6 | | 1.8 | 0.18 |
| 6 | Sheet shape deteriorates at time of cold rolling, so sample unobtainable | | | | | | | |
| 7 | Sheet breaks at time of cold rolling, so sample unobtainable | | | | | | | |
| 8 | 60 | 8 | 23 | 5 | 4 | | 2.0 | 0.20 |
| 9 | 15 | 60 | 25 | | | | 1.4 | 0.16 |
| 10 | 73 | | 27 | | | | 1.4 | 0.16 |
| 11 | 48 | 42 | | 10 | | | 2.0 | 0.20 |
| 12 | 66 | 4 | 20 | 5 | 5 | | 1.6 | 0.17 |
| 13 | 43 | 12 | 45 | | | | 1.5 | 0.17 |
| 14 | 78 | | 22 | | | | 1.8 | 0.19 |
| 15 | 35 | 30 | | 35 | | | 0.7 | 0.19 |
| 16 | 70 | | 25 | | 5 | | 2.5 | 0.23 |
| 17 | 30 | 31 | 29 | 10 | | | 1.7 | 0.18 |
| 18 | 78 | | 22 | | | | 2.5 | 0.23 |
| 19 | 20 | | 80 | | | | 1.7 | 0.18 |
| 20 | 61 | | 26 | 8 | 5 | | 1.7 | 0.18 |
| 21 | 30 | | 25 | | 5 | 40 | 2.2 | 0.21 |
| 22 | 10 | | 80 | | 10 | | 1.8 | 0.19 |
| 23 | 73 | | 27 | | | | 1.9 | 0.20 |
| 24 | 55 | | 29 | | | 16 | 2.8 | 0.25 |
| 25 | 92 | | 8 | | | | 1.7 | 0.18 |
| 26 | 91 | | 9 | | | | 1.7 | 0.18 |

| Test cond. | Standard deviation of grain size of carbides contained in surface soft part | Tensile strength (MPa) | Bendability (R/t) | Hydrogen embrittlement resistance | |
|---|---|---|---|---|---|
| 1 | 0.047 | 1474 | 1.0 | Good | Ex. |
| 2 | 0.047 | 1488 | 3.0 | Bendability poor | Comp. ex. |
| 3 | 0.047 | 1307 | 1.0 | Good | Ex. |
| 4 | 0.047 | 1515 | 2.5 | Poor | Comp. ex. |
| 5 | 0.047 | 1763 | 1.0 | Good | Ex. |

TABLE 14-continued

| | | | | | |
|---|---|---|---|---|---|
| 6 | Sheet shape deteriorates at time of cold rolling, so sample unobtainable | | | | Comp. ex. |
| 7 | Sheet breaks at time of cold rolling, so sample unobtainable | | | | Comp. ex. |
| 8 | 0.047 | 1640 | 1.0 | Good | Ex. |
| 9 | 0.047 | 1050 | 1.0 | Good | Comp. ex. |
| 10 | 0.047 | 1211 | 1.0 | Good | Ex. |
| 11 | 0.047 | 1100 | 1.0 | Good | Comp. ex. |
| 12 | 0.047 | 1334 | 1.0 | Good | Ex. |
| 13 | 0.047 | 1170 | 1.0 | Good | Comp. ex. |
| 14 | 0.047 | 1503 | 1.0 | Good | Ex. |
| 15 | 0.047 | 1127 | 2.5 | Bendability poor | Comp. ex. |
| 16 | 0.046 | 1515 | 1.0 | Good | Ex. |
| 17 | 0.047 | 1120 | 1.0 | Good | Comp. ex. |
| 18 | 0.047 | 1471 | 1.0 | Good | Ex. |
| 19 | 0.047 | 1160 | 1.0 | Good | Comp. ex. |
| 20 | 0.047 | 1428 | 1.0 | Good | Ex. |
| 21 | 0.047 | 1400 | 3.5 | Bendability poor | Comp. ex. |
| 22 | 0.047 | 1159 | 1.0 | Good | Comp. ex. |
| 23 | 0.047 | 1756 | 1.0 | Good | Ex. |
| 24 | 0.046 | 1390 | 2.5 | Bendability poor | Comp. ex. |
| 25 | 0.047 | 1253 | 1.0 | Good | Ex. |
| 26 | 0.047 | 1196 | 1.0 | Good | Ex. |

TABLE 15

| Test cond. | Volume percentages of microstructures of central part of sheet thickness/% | | | | | | Number density of carbides contained in surface soft part ($\times 10^4$/mm$^2$) | Average grain size of carbides contained in surface soft part (μm) |
|---|---|---|---|---|---|---|---|---|
| | Tempered martensite | Ferrite | Bainite | Pearlite | Retained austenite | As-quenched martensite | | |
| 27 | 67 | | 29 | | 4 | | 1.4 | 0.16 |
| 28 | 45 | | 28 | | | 27 | 1.4 | 0.16 |
| 29 | 60 | | 35 | 5 | | | 1.8 | 0.19 |
| 30 | 55 | | 29 | | | 16 | 2.2 | 0.21 |
| 31 | 70 | | 29 | | 1 | | 1.6 | 0.18 |
| 32 | 60 | 3 | 28 | 5 | 4 | | 1.7 | 0.18 |
| 33 | 73 | | 27 | | | | 1.6 | 0.17 |
| 34 | 73 | | 26 | | 1 | | 1.6 | 0.17 |
| 35 | 73 | | 23 | | 4 | | 1.7 | 0.18 |
| 36 | 67 | 4 | 21 | 3 | 5 | | 1.5 | 0.17 |
| 37 | 67 | 2 | 23 | 2 | 6 | | 1.7 | 0.18 |
| 38 | 60 | 3 | 29 | 3 | 5 | | 2.7 | 0.24 |
| 39 | 60 | 5 | 29 | 2 | 4 | | 1.5 | 0.17 |
| 40 | 73 | | 27 | | | | 2.0 | 0.20 |
| 41 | 77 | | 23 | | | | 2.8 | 0.25 |
| 42 | 67 | | 27 | 2 | 4 | | 1.5 | 0.17 |
| 43 | 86 | | 14 | | | | 1.4 | 0.16 |
| 44 | 61 | 8 | 23 | 3 | 4 | 1 | 1.8 | 0.19 |
| 45 | 70 | 4 | 18 | 5 | 3 | | 1.5 | 0.17 |
| 46 | 75 | | 25 | | | | 1.8 | 0.19 |
| 47 | 61 | | 29 | 2 | 8 | | 1.7 | 0.18 |
| 48 | 63 | | 10 | | 27 | | 1.6 | 0.17 |
| 49 | 20 | 70 | 10 | | | | 1.7 | 0.18 |
| 50 | 50 | | 18 | 12 | | 20 | 1.7 | 0.18 |
| 51 | 48 | 11 | 23 | 18 | | | 1.9 | 1.3 |
| 52 | 63 | 10 | 27 | | | | 1.2 | 0.24 |
| 53 | 15 | 45 | 24 | 16 | | | 1.9 | 0.20 |

| Test cond. | Standard deviation of grain size of carbides contained in surface soft part | Tensile strength (MPa) | Bendability (R/t) | Hydrogen embrittlement resistance | |
|---|---|---|---|---|---|
| 27 | 0.047 | 1207 | 1.0 | Good | Ex. |
| 28 | 0.047 | 1465 | 3.5 | Bendability poor | Comp. ex. |
| 29 | 0.047 | 1152 | 1.0 | Good | Comp. ex. |
| 30 | 0.047 | 1302 | 2.0 | Good | Comp. ex. |
| 31 | 0.047 | 1214 | 1.0 | Good | Ex. |
| 32 | 0.047 | 1208 | 1.0 | Good | Ex. |
| 33 | 0.047 | 1212 | 1.0 | Good | Ex. |
| 34 | 0.047 | 1261 | 1.0 | Good | Ex. |
| 35 | 0.047 | 1619 | 1.0 | Good | Ex. |
| 36 | 0.047 | 1770 | 1.0 | Good | Ex. |
| 37 | 0.047 | 1627 | 1.0 | Good | Ex. |
| 38 | 0.046 | 1295 | 1.0 | Good | Ex. |

TABLE 15-continued

| | | | | | |
|---|---|---|---|---|---|
| 39 | 0.047 | 1333 | 1.0 | Good | Ex. |
| 40 | 0.047 | 1383 | 1.0 | Good | Ex. |
| 41 | 0.046 | 1236 | 1.0 | Good | Ex. |
| 42 | 0.047 | 1383 | 1.0 | Good | Ex. |
| 43 | 0.047 | 1362 | 1.0 | Good | Ex. |
| 44 | 0.047 | 1490 | 1.0 | Good | Ex. |
| 45 | 0.047 | 1682 | 1.0 | Good | Ex. |
| 46 | 0.047 | 1217 | 1.0 | Good | Ex. |
| 47 | 0.047 | 1217 | 1.0 | Good | Ex. |
| 48 | 0.047 | 1402 | 1.0 | Good | Ex. |
| 49 | 0.047 | 1085 | 1.0 | Good | Comp. ex. |
| 50 | 0.047 | 2024 | 2.0 | Good | Comp. ex. |
| 51 | 0.047 | 1655 | 1.5 | Good | Comp. ex. |
| 52 | 0.047 | 1284 | 3.0 | Bendability poor | Comp. ex. |
| 53 | 0.047 | 1697 | 1.0 | Good | Comp. ex. |

TABLE 16

| Test cond. | Volume percentages of microstructures of central part of sheet thickness/% | | | | | | Number density of carbides contained in surface soft part ($\times 10^4/mm^2$) | Average grain size of carbides contained in surface soft part (μm) |
|---|---|---|---|---|---|---|---|---|
| | Tempered martensite | Ferrite | Bainite | Pearlite | Retained austenite | As-quenched martensite | | |
| 54 | 10 | 10 | 20 | 20 | 40 | | 1.8 | 0.19 |
| 55 | 70 | 4 | 22 | | 4 | | 2.2 | 0.21 |
| 56 | 73 | | 27 | | | | 2.1 | 0.21 |
| 57 | 70 | | 28 | | 2 | | 1.7 | 0.18 |
| 58 | 75 | | 25 | | | | 2.0 | 0.20 |
| 59 | 70 | | 29 | | 1 | | 2.6 | 0.24 |
| 60 | 70 | | 27 | | 3 | | 1.8 | 0.19 |
| 61 | 63 | 3 | 26 | 2 | 4 | 2 | 1.6 | 0.18 |
| 62 | 70 | | 28 | | 2 | | 1.8 | 0.19 |
| 63 | 73 | | 27 | | | | 1.7 | 0.18 |
| 64 | 66 | 2 | 23 | 3 | 5 | 1 | 1.7 | 0.18 |
| 65 | 62 | 6 | 22 | 3 | 5 | 2 | 1.9 | 0.19 |
| 66 | 63 | 4 | 27 | 4 | | 2 | 1.6 | 0.17 |
| 67 | 72 | | 28 | | | | 1.9 | 0.20 |
| 68 | 73 | 3 | 17 | 4 | | 3 | 1.5 | 0.17 |
| 69 | 83 | 4 | 13 | | | | 1.4 | 0.16 |
| 70 | 74 | | 24 | | 2 | | 2.9 | 0.26 |
| 71 | 85 | | 15 | | | | 1.9 | 0.19 |
| 72 | 86 | | 14 | | | | 1.3 | 0.26 |
| 73 | 70 | 3 | 17 | 4 | 3 | 3 | 1.2 | 0.24 |

| Test cond. | Standard deviation of grain size of carbides contained in surface soft part | Tensile strength (MPa) | Bendability (R/t) | Hydrogen embrittlement resistance | |
|---|---|---|---|---|---|
| 54 | 0.047 | 1824 | 1.5 | Good | Comp. ex. |
| 55 | 0.047 | 1786 | 2.0 | Good | Comp. ex. |
| 56 | 0.047 | 1196 | 2.0 | Good | Comp. ex. |
| 57 | 0.047 | 1377 | 2.0 | Good | Comp. ex. |
| 58 | 0.047 | 1198 | 2.0 | Good | Comp. ex. |
| 59 | 0.046 | 1363 | 2.0 | Good | Comp. ex. |
| 60 | 0.047 | 1625 | 2.0 | Good | Comp. ex. |
| 61 | 0.047 | 1712 | 2.0 | Good | Comp. ex. |
| 62 | 0.047 | 1360 | 2.0 | Good | Comp. ex. |
| 63 | 0.047 | 1216 | 2.0 | Good | Comp. ex. |
| 64 | 0.047 | 1560 | 2.0 | Good | Comp. ex. |
| 65 | 0.047 | 1368 | 2.0 | Good | Comp. ex. |
| 66 | 0.047 | 1812 | 2.0 | Good | Comp. ex. |
| 67 | 0.047 | 1335 | 2.0 | Good | Comp. ex. |
| 68 | 0.047 | 1766 | 2.0 | Good | Comp. ex. |
| 69 | 0.047 | 1741 | 2.0 | Good | Comp. ex. |
| 70 | 0.046 | 1414 | 2.0 | Good | Comp. ex. |
| 71 | 0.047 | 1833 | 1.0 | Good | Ex. |
| 72 | 0.047 | 1344 | 3.0 | Bendability poor | Comp. ex. |
| 73 | 0.12 | 1475 | 3.5 | Bendability poor | Comp. ex. |

According to the present invention, it could be confirmed that steel sheet having both excellent bendability and hydrogen embrittlement resistance is obtained.

INDUSTRIAL APPLICABILITY

According to the present invention, it is possible to provide steel sheet having both excellent bendability and hydrogen embrittlement resistance. Such a steel sheet of the present invention is, for example, optimal for a structural material in the field of automobiles and other transport equipment.

The invention claimed is:

1. A steel sheet comprising a central part of sheet thickness and a surface soft part formed on one side or both sides of the central part of sheet thickness, wherein
   a microstructure of the central part of sheet thickness comprises, by volume ratio, 60% or more of tempered martensite, less than 30% of ferrite, bainite, pearlite, and retained austenite, respectively, and less than 5% of as-quenched martensite,
   a thickness of the surface soft part is more than 10 μm at each side and 15% or less of a thickness of the central part of sheet thickness,
   an average hardness of the surface soft part is 0.90 time or less of an average hardness of the central part of sheet thickness,
   the surface soft part comprises carbides at a number density of $1 \times 10^4/mm^2$ or more, an average particle size of the carbides being 0.250 μm or less, and a standard deviation of a log of a particle size being 0.05 or less,
   a tensile strength of the steel sheet is 1180 MPa or more, and
   a chemical composition of the central part of sheet thickness comprising, by mass %,
   C: 0.10% or more and 0.30% or less,
   Si: 0.10% or more and 2.50% or less,
   Mn: 0.10% or more and 10.00% or less,
   P: 0.10% or less,
   S: 0.050% or less,
   Al: 0% or more and 2.500% or less,
   N: 0.0100% or less,
   O: 0.0060% or less,
   Cr: 0% or more and 5.000% or less,
   Mo: 0% or more and 1.000% or less,
   B: 0% or more and 0.0100% or less,
   Ti: 0% or more and 0.300% or less,
   Nb: 0% or more and 0.300% or less,
   V: 0% or more and 0.50% or less,
   Cu: 0% or more and 1.00% or less,
   Ni: 0% or more and 1.0% or less,
   Mg: 0% or more and 0.04% or less,
   Ca: 0% or more and 0.04% or less,
   REM: 0% or more and 0.04% or less, and
   a balance of Fe and impurities.

2. The steel sheet according to claim 1, wherein the chemical composition of the central part of sheet thickness contains one or more elements selected from, by mass %,
   Cr: 0.010% or more and 5.000% or less,
   Mo: 0.010% or more and 1.000% or less,
   B: 0.0001% or more and 0.0100% or less,
   Ti: 0.010% or more and 0.300% or less,
   Nb: 0.010% or more and 0.300% or less,
   V: 0.01% or more and 0.50% or less,
   Cu: 0.01% or more and 1.00% or less,
   Ni: 0.1% or more and 1.0% or less,
   Mg: 0.01% or more and 0.04% or less,
   Ca: 0.01% or more and 0.04% or less, and
   REM: 0.01% or more and 0.04% or less.

3. The steel sheet according to claim 1, wherein the content of C in the surface soft part is 0.9 time or less of the content of C in the central part of sheet thickness.

4. The steel sheet according to claim 1, wherein a surface of the surface soft part further has a hot dip galvanized layer, a hot dip galvannealed layer, or an electrogalvanized layer.

5. The steel sheet according to claim 2, wherein the content of C in the surface soft part is 0.9 time or less of the content of C in the central part of sheet thickness.

6. The steel sheet according to claim 2, wherein a surface of the surface soft part further has a hot dip galvanized layer, a hot dip galvannealed layer, or an electrogalvanized layer.

7. The steel sheet according to claim 3, wherein a surface of the surface soft part further has a hot dip galvanized layer, a hot dip galvannealed layer, or an electrogalvanized layer.

* * * * *